US012042824B1

(12) United States Patent
Mitchell et al.

(10) Patent No.: US 12,042,824 B1
(45) Date of Patent: Jul. 23, 2024

(54) AUTOMATED, SINGLE LEVEL, PACKAGE SORTATION SYSTEM

(71) Applicant: Amazon Technologies, Inc., Seattle, WA (US)

(72) Inventors: Julie Mitchell, Lynnfield, MA (US); Vikas Reddy Enti, Somerville, MA (US); Andrea Thelen, Westphalia, MI (US)

(73) Assignee: Amazon Technologies, Inc., Seattle, WA (US)

( * ) Notice: Subject to any disclaimer, the term of this patent is extended or adjusted under 35 U.S.C. 154(b) by 54 days.

(21) Appl. No.: 17/231,660

(22) Filed: Apr. 15, 2021

(51) Int. Cl.

| | |
|---|---|
| ***B07C 3/08*** | (2006.01) |
| ***B07C 3/14*** | (2006.01) |
| ***B07C 5/24*** | (2006.01) |
| ***B07C 5/34*** | (2006.01) |
| ***B07C 5/36*** | (2006.01) |

(52) U.S. Cl.
CPC ................ *B07C 3/087* (2013.01); *B07C 3/14* (2013.01); *B07C 5/24* (2013.01); *B07C 5/34* (2013.01); *B07C 5/36* (2013.01); *B07C 2501/0063* (2013.01)

(58) Field of Classification Search
CPC .. B07C 3/087; B07C 5/36; B07C 5/38; B07C 2501/0063
USPC .......................................................... 198/349
See application file for complete search history.

(56) References Cited

U.S. PATENT DOCUMENTS

| | | | | |
|---|---|---|---|---|
| 8,952,284 B1 * | 2/2015 | Wong | B07C 5/3412 | 209/586 |
| 8,972,045 B1 * | 3/2015 | Mountz | G06Q 10/087 | 700/229 |
| 2007/0071585 A1 * | 3/2007 | Henkel | B66F 9/0755 | 414/471 |
| 2017/0043953 A1 * | 2/2017 | Battles | B65G 1/04 | |

FOREIGN PATENT DOCUMENTS

WO WO-2020229973 A1 * 11/2020 ........... B65G 1/0464

* cited by examiner

*Primary Examiner* — Michael McCullough
*Assistant Examiner* — Molly K Devine
(74) *Attorney, Agent, or Firm* — Athorus, PLLC

(57) ABSTRACT

An automated, single level, package sortation system may include a conveyance mechanism, a package induct station with a first robotic arm, a first drive unit, a cart building station with a second robotic arm, a cart, and a cart transfer station. Each package and cart of the system may have an associated destination. A package may be transferred by a first robotic arm from a conveyance mechanism to a first drive unit, and then transferred by a second robotic arm from a first drive unit to a cart associated with the same destination as the package. Then, the cart may be transferred via a cart transfer station to the destination associated with the cart and all packages contained therein.

20 Claims, 9 Drawing Sheets

AUTOMATED, SINGLE LEVEL, PACKAGE SORTATION SYSTEM

BACKGROUND

Many companies may store, package, and ship items and/or groups of items from material handling facilities. For example, many companies may store items in a material handling facility and ship items to various destinations (e.g., customers, stores) from the material handling facility. Various material handling systems and processes, including receipt, sorting, storage, packing, shipping, or other processing of items within a material handling facility, often incur significant cost and time. Accordingly, there is a need for flexible and automated systems and methods to facilitate the various material handling processes within a material handling facility, thereby improving the speed and efficiency of such processes.

DETAILED DESCRIPTION

Figure 1:
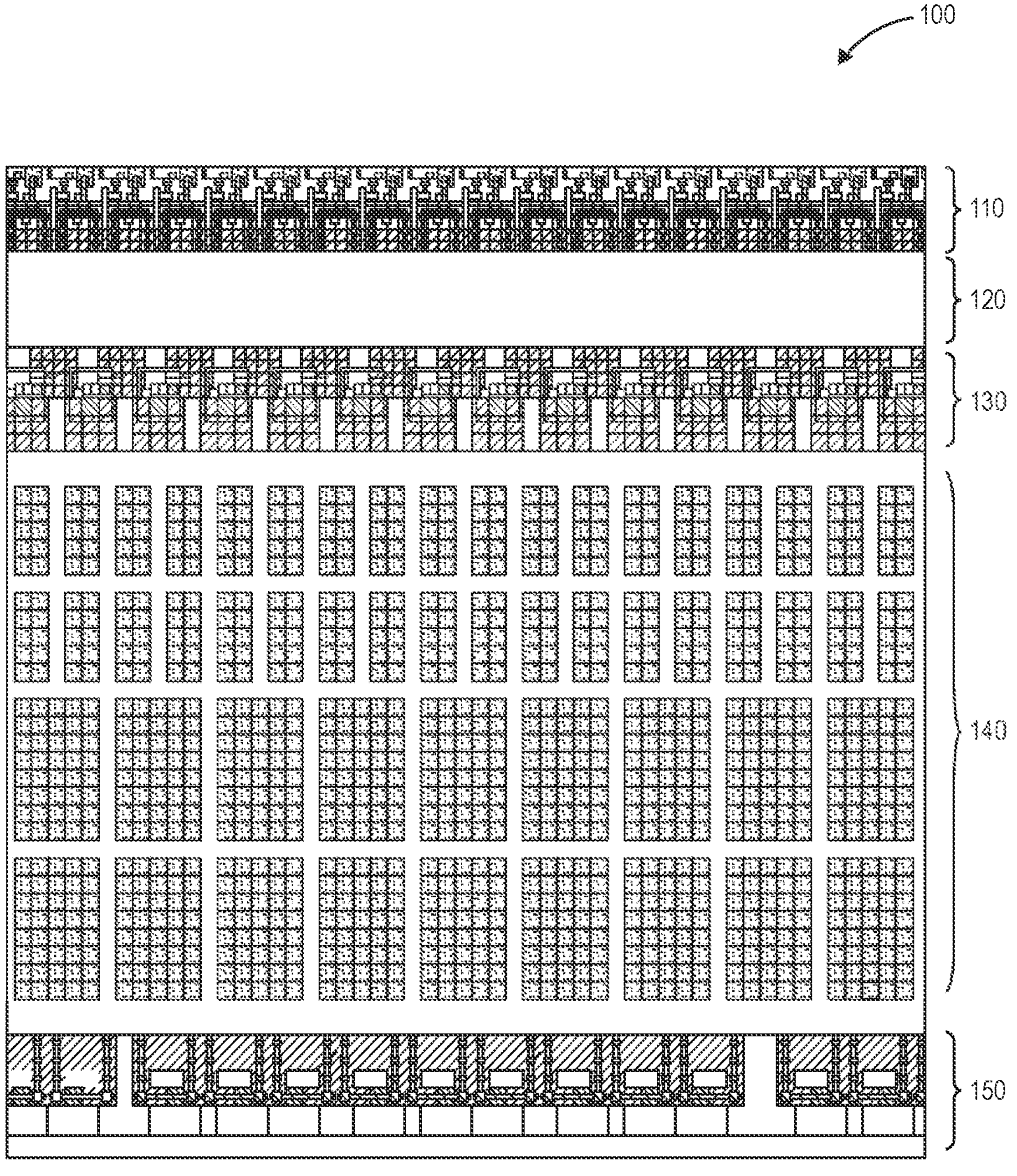
FIG. 1 is a schematic, overhead view diagram of an example package sortation system, in accordance with implementations of the present disclosure.

As is set forth in greater detail below, implementations of the present disclosure are directed to automated, single level, package sortation systems and associated methods. The package sortation systems and methods described herein may reduce capital and operating costs, and may increase density and flexibility of sortation points, as compared to conventional sortation systems. In addition, the package sortation systems and methods described herein may maintain or increase throughput as compared to conventional sortation systems.

In example embodiments, the automated, single level, package sortation systems and methods may comprise conveyance mechanisms, robotic drive units, carts, robotic arms, package induct stations, a first drive unit field, cart building stations, a sortation or storage field or area, cart transfer stations, and/or other components, devices, machinery, or equipment.

For example, at the package induct stations, robotic arms may grasp packages from conveyance mechanisms, e.g., conveyors, and may transfer the packages to robotic drive units. Each of the packages may have an associated destination, e.g., a region, area, zip code, or other type or group of locations or areas. The conveyors may receive and transfer the packages toward the package induct stations, and the robotic arms may induct and/or singulate the packages onto individual robotic drive units. Then, the robotic drive units may move or transfer the packages downstream to the cart building stations via the first drive unit field.

In addition, at the cart building stations, robotic arms may grasp packages from the robotic drive units, and may transfer the packages to carts or other containers. Each of the carts or containers may have an associated destination, e.g., a region, area, zip code, or other type or group of locations or areas, and the packages may be sorted to carts or containers having the same associated destinations as the respective packages. In addition, the carts or containers may also be moved by robotic drive units. Further, the carts or containers may be retrieved, moved, placed, sorted, and/or stored within a sortation or storage field or area.

Furthermore, at the cart transfer stations, carts or containers that are full or ready to ship may be ejected from the sortation field, and may be transferred downstream, e.g., for shipping or transport to their associated destinations. In addition, empty carts or containers may be injected into the sortation field to receive packages, and may also be associated with particular destinations.

Using the automated, single level, package sortation systems and methods described herein, packages having associated destinations may be received and sorted, via robotic arms and robotic drive units at and between various processing stations and sortation fields, to carts or containers that are also associated with particular destinations. In this manner, packages may be sorted at induct with a reduced number of touches or operations, and the packages may also be sorted to a flexible and variable number of sortation points or destinations associated with the carts or containers. As a result, the automated, single level, package sortation systems described herein may have reduced capital and operating costs as compared to conventional sortation systems, such as mezzanine and chute sortation systems, while also maintaining or increasing sort density, flexibility, and/or throughput.

FIG. 1 is a schematic, overhead view diagram 100 of an example package sortation system, in accordance with implementations of the present disclosure.

As shown in FIG. 1, the example package sortation system may include a plurality of package induct stations 110, a first drive unit field or area 120, a plurality of cart building stations 130, a sortation or storage field or area 140, and a plurality of cart transfer stations 150. Generally, the example package sortation system may receive, transfer, sort, store, and ship packages that have associated destinations. In other example embodiments, the packages may comprise items, objects, containers, totes, bins, or any other types or groups of objects that also have associated destinations. Further, the example package sortation system may generally receive packages or other objects at the plurality of package induct stations 110, the packages may be moved substantially sequentially from the plurality of package induct stations 110 through the first drive unit field 120, the plurality of cart building stations 130, the sortation field 140, and the plurality of cart transfer stations 150, from which the packages may ultimately exit the system. Moreover, the example package sortation system may be implemented in a material handling facility, a warehouse, a sortation center, a distribution center, or any other facility or environment that receives or processes packages or objects having associated or known destinations.

The plurality of package induct stations 110 may be positioned adjacent or near one or more conveyance mechanisms, e.g., conveyors, slides, chutes, buffer or storage zones, or other types of conveyance mechanisms. The one or more conveyance mechanisms may transfer packages from various upstream processes or systems to the plurality of package induct stations 110.

In addition, the plurality of package induct stations 110 may include one or more imaging devices, scanning devices, radiofrequency identification (RFID) readers, or other types of imaging, scanning, or identification devices. The one or more imaging devices may detect and identify individual packages, e.g., by imaging or scanning identifiers associated with the packages, such as barcodes, quick response (QR) codes, text, characters, symbols, or other types of identifiers or codes. The one or more imaging devices may also detect and identify individual first drive units, e.g., by imaging or scanning identifiers associated with the first drive units, such as barcodes, QR codes, text, characters, symbols, or other types of identifiers or codes, as further described herein.

Further, individual package induct stations of the plurality of package induct stations 110 may include respective first robotic arms. The first robotic arms may comprise six-axis robotic arms or manipulators, robotic arms with different degrees of freedom, gantry systems, or other types of grasping mechanisms, and the first robotic arms may have associated end effectors to grasp, lift, move, transfer, and release packages. The first robotic arms may grasp packages from the one or more conveyance mechanisms, and may transfer the packages to one or more first robotic drive units associated with the first drive unit field 120. Further details of the plurality of package induct stations 110 are described herein at least with respect to FIGS. 2 and 3.

The first drive unit field 120 may comprise a field, area, or grid within which a plurality of first robotic drive units, e.g., first drive units, may move and transfer packages between the plurality of package induct stations 110 and the plurality of cart building stations 130. In example embodiments, the first drive unit field 120 may be a structured field or grid having identifiers, fiducials, codes, or other markers, such as barcodes, QR codes, text, characters, symbols, or other types of identifiers or codes, at particular locations in order to aid navigation and movement of the first drive units. In other example embodiments, the first drive unit field 120 may be an unstructured field or area, and the first drive units may include one or more sensors, such as global positioning system (GPS) sensors, indoor positioning sensors, other position determination sensors, imaging sensors, RFID sensors, or other types of sensors, to navigate and move within the first drive unit field 120.

The first drive units may move toward a portion of the first drive unit field 120 adjacent or near the plurality of package induct stations 110 to receive packages. For example, each package induct station may have an adjacent queue into and through which the first drive units may move. Each first drive unit may receive a package having an associated destination, or a plurality of packages having the same associated destination, from a first robotic arm of a package induct station. The first drive units may then move or navigate within the first drive unit field 120 to transfer the package, or packages, toward a cart building station of the plurality of cart building stations 130. Further details of the first drive unit field 120 are described herein at least with respect to FIGS. 2 and 3.

The plurality of cart building stations 130 may be positioned adjacent or near the first drive unit field 120 to receive packages from the first drive units. For example, each cart building station may have an adjacent queue into and through which the first drive units may move with packages.

In addition, the plurality of cart building stations 130 may include one or more imaging devices, scanning devices, RFID readers, or other types of imaging, scanning, or identification devices. The one or more imaging devices may detect and identify individual packages, e.g., by imaging or scanning identifiers associated with the packages, such as barcodes, QR codes, text, characters, symbols, or other types of identifiers or codes. The one or more imaging devices may also detect and identify individual first drive units, e.g., by imaging or scanning identifiers associated with the first drive units, such as barcodes, QR codes, text, characters, symbols, or other types of identifiers or codes, as further described herein. Furthermore, the one or more imaging devices may also detect and identify individual carts and/or second robotic drive units, e.g., by imaging or scanning identifiers associated with the carts and/or second robotic drive units, such as barcodes, QR codes, text, characters, symbols, or other types of identifiers or codes, as further described herein.

Further, individual cart building stations of the plurality of cart building stations 130 may include respective second robotic arms. The second robotic arms may comprise six-axis robotic arms or manipulators, robotic arms with different degrees of freedom, gantry systems, or other types of grasping mechanisms, and the second robotic arms may have associated end effectors to grasp, lift, move, transfer, and release packages. The second robotic arms may grasp packages from the first drive units, and may transfer the packages to one or more carts moved by second robotic drive units associated with the sortation field 140.

Moreover, the plurality of cart building stations 130 may be positioned adjacent or near the sortation field 140 to transfer packages to the carts and/or second robotic drive units. For example, each cart building station may have an adjacent queue into and through which the second robotic drive units may move carts to receive packages. Further details of the plurality of cart building stations 130 are described herein at least with respect to FIGS. 2 and 3.

The sortation field 140 may comprise a field, area, or grid within which a plurality of second robotic drive units, e.g., second drive units, may move and transfer carts with packages between the plurality of cart building stations 130 and the plurality of cart transfer stations 150. In example embodiments, the sortation field 140 may be a structured field or grid having identifiers, fiducials, codes, or other markers, such as barcodes, QR codes, text, characters, symbols, or other types of identifiers or codes, at particular locations in order to aid navigation and movement of carts by the second drive units. In other example embodiments, the sortation field 140 may be an unstructured field or area, and the second drive units may include one or more sensors, such as GPS sensors, indoor positioning sensors, other position determination sensors, imaging sensors, RFID sensors, or other types of sensors, to navigate and move carts within the sortation field 140.

The second drive units may move respective carts toward a portion of the sortation field 140 adjacent or near the plurality of cart building stations 130 to receive packages.

As described herein, each cart building station may have an adjacent queue into and through which the second drive units may move carts to receive packages. Each cart may have an associated destination, and as a result, each cart moved by a second drive unit may receive a package having a same associated destination, or a plurality of packages having the same associated destination, from a second robotic arm of a cart building station. The second drive units may then move or navigate the carts within the sortation field 140 to place, sort, store, retrieve, ship, or transfer the carts having one or more packages with associated destinations. Further details of the sortation field 140 are described herein at least with respect to FIGS. 2 and 3.

The plurality of cart transfer stations 150 may be positioned adjacent or near the sortation field 140 to receive carts from the second drive units for shipping or transport. For example, each cart transfer station may have an adjacent queue into and through which the second drive units may move carts with packages.

In addition, the plurality of cart transfer stations 150 may include one or more imaging devices, scanning devices, RFID readers, or other types of imaging, scanning, or identification devices. The one or more imaging devices may detect and identify individual packages, e.g., by imaging or scanning identifiers associated with the packages, such as barcodes, QR codes, text, characters, symbols, or other types of identifiers or codes. Further, the one or more imaging devices may also detect and identify individual carts and/or second robotic drive units, e.g., by imaging or scanning identifiers associated with the carts and/or second robotic drive units, such as barcodes, QR codes, text, characters, symbols, or other types of identifiers or codes, as further described herein.

Further, the plurality of cart transfer stations 150 may include one or more agents, operators, conveyance mechanisms, or other equipment or machinery to receive, store, move, and transfer the carts to one or more shipping or transport systems, e.g., freight containers, trailers, trucks, airplanes, boats, or other types of shipping or transport systems via one or more dock doors, e.g., outbound dock doors of the package sortation system. As set forth herein, because each cart may have an associated destination, and because all packages received by each cart may also have the same associated destination, each cart may be routed to the associated destination via a respective cart transfer station, outbound dock door, and shipping system.

Moreover, the plurality of cart transfer stations 150 may also receive one or more empty carts, and the one or more agents, operators, conveyance mechanisms, or other equipment or machinery may inject the empty carts into the sortation field 140 via the cart transfer stations 150. Then, the second drive units may engage, move, place, store, sort, and retrieve the empty carts within the sortation field 140. In addition, each empty cart may also have an associated destination, in order to receive packages having the same associated destination. Further details of the plurality of cart transfer stations 150 are described herein at least with respect to FIGS. 2 and 4.

Although FIG. 1 illustrates a particular number, type, size, dimensions, configuration, and arrangement of package induct stations, first drive unit field, cart building stations, sortation field, and cart transfer stations, other example embodiments of the package sortation system described herein may include various other numbers, types, sizes, dimensions, configurations, or arrangements of the various components or elements described herein.

Figure 2:
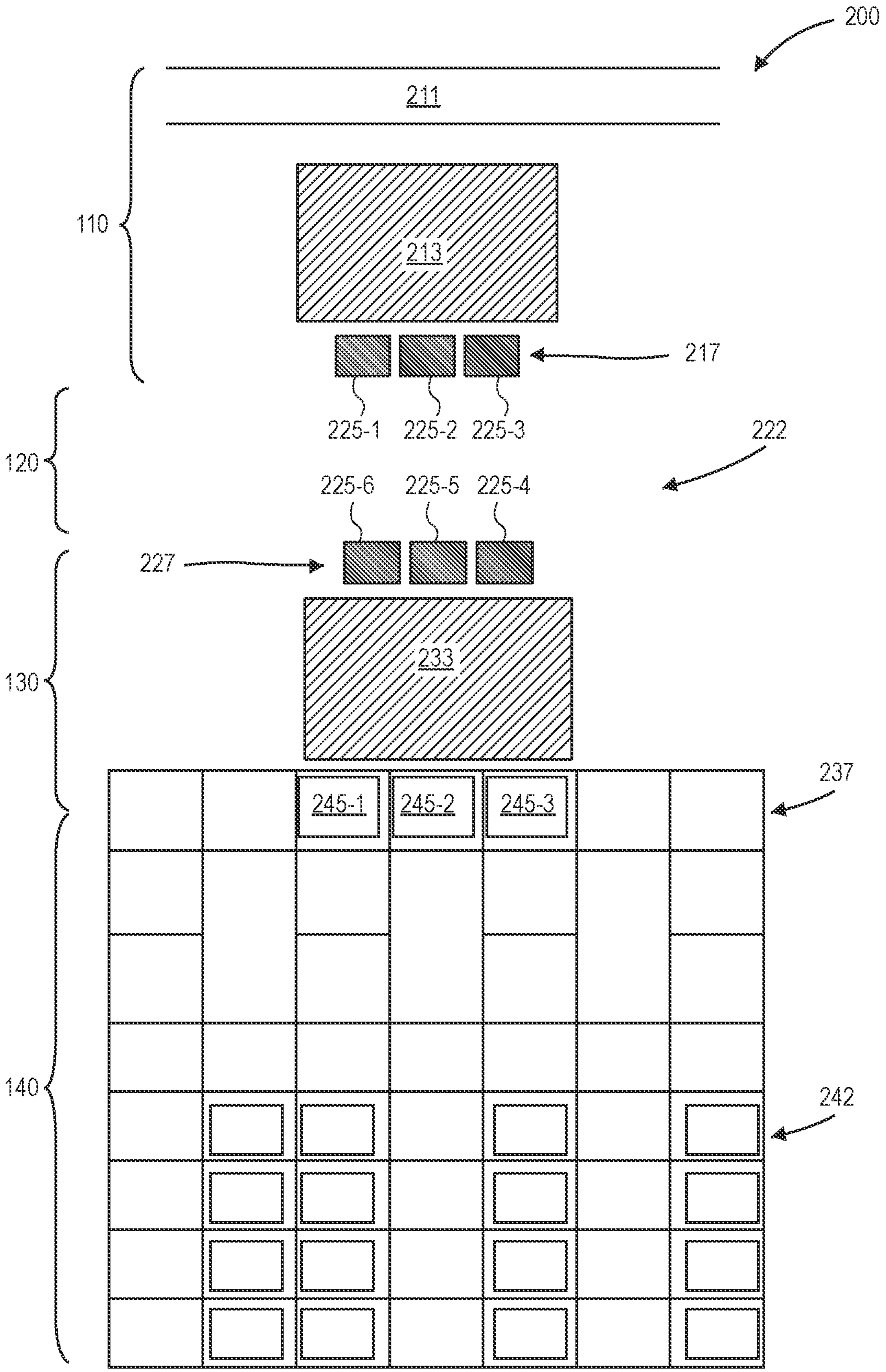
FIG. 2 is a schematic, overhead view diagram of an example portion of a package sortation system, in accordance with implementations of the present disclosure.

FIG. 2 is a schematic, overhead view diagram 200 of an example portion of a package sortation system, in accordance with implementations of the present disclosure.

As shown in FIG. 2, the example portion of the package sortation system may include portions of a package induct station 110, a first drive unit field 120, a cart building station 130, and a sortation field 140. Only a portion of the package sortation system is illustrated in order to describe portions thereof in more detail.

The package induct station 110 may include a conveyance mechanism, e.g., a conveyor 211, a first robotic arm 213, and a first queue 217 that may receive a plurality of first drive units 225-1, 225-2, 225-3. For example, the package induct station 110 may receive a plurality of packages via the conveyor 211. The plurality of packages may arrive from various upstream processes or systems. In addition, each package may include a package identifier and may be associated with a particular destination.

The first robotic arm 213 may grasp packages from the conveyor 211, e.g., one package at a time. In addition, the package induct station 110 may also include an imaging or scanning device to detect or capture a package identifier associated with a package that is grasped by the first robotic arm 213. By processing and identifying the package identifier using various image processing techniques or algorithms, various characteristics of the package including an identity, source, contents, destination, or other characteristics may be determined, e.g., by reference to a datastore or table storing data associated with package identifiers and their associated characteristics.

The first queue 217 may comprise one or more positions or locations adjacent or near the first robotic arm 213 of the package induct station 110. One or more first drive units 225-1, 225-2, 225-3 may move into and/or through the positions of the first queue 217, and the first drive units 225 may include upper surfaces, containers, trays, bins, or other receptacles configured to receive packages. Then, the first robotic arm 213 may transfer packages from the conveyor 211 to the receptacles of the first drive units 225. In some example embodiments, a first drive unit may receive one package at a time, in which the package has an associated destination. In other example embodiments, a first drive unit may receive a plurality of packages at a time, in which case each of the plurality of packages may have the same associated destination.

The imaging or scanning device of the package induct station 110 may also detect or capture a first drive unit identifier associated with a first drive unit 225 that receives a package from the first robotic arm 213. By processing and identifying the first drive unit identifier using various image processing techniques or algorithms, various characteristics of the first drive unit 225 including an identity, capabilities, or other characteristics may be determined, e.g., by reference to a datastore or table storing data associated with first drive unit identifiers and their associated characteristics.

Further, in response to transferring a package having a package identifier to a first drive unit having a first drive unit identifier, the package identifier may be associated with the first drive unit identifier, e.g., stored in a datastore or table. In this manner, the package sortation system may associate a package with a first drive unit that has received the package.

A first drive unit 225 that has received a package from the first robotic arm 213 of the package induct station 110 may then navigate or move within the first drive unit field 120. The first drive unit field 120 may comprise a structured or unstructured floor, area, or grid 222 upon which the first drive units 225 navigate between the package induct station 110 and the cart building station 130. In example embodiments having a structured floor or grid 222, a plurality of identifiers, fiducials, codes, or other markers, such as barcodes, QR codes, text, characters, symbols, or other types of identifiers or codes, may be positioned at particular locations of the floor in order to aid navigation and movement of the first drive units 225. Further, the first drive units 225 may include imaging or scanning sensors or devices that are positioned and oriented to detect and capture the identifiers or fiducials on the floor. In other example embodiments having an unstructured floor or area 222, the first drive units may include one or more sensors, such as GPS sensors, indoor positioning sensors, other position determination sensors, imaging sensors, RFID sensors, or other types of sensors, to navigate and move along the floor within the first drive unit field 120.

The first drive units 225 may navigate toward the cart building station 130. For example, the cart building station 130 may include a second queue 227 that may receive a plurality of first drive units 225-4, 225-5, 225-6, a second robotic arm 233, and a third queue 237 that may receive a plurality of carts 245-1, 245-2, 245-3 coupled to and moved by second drive units. For example, the cart building station 130 may receive a plurality of packages from the first drive units 225 via the second queue 227. In addition, each package may include a package identifier and may be associated with a particular destination. Further, the cart building station 130 may transfer the plurality of packages to a plurality of carts 245 moved by second drive units via the third queue 237.

The second robotic arm 233 may grasp packages from the first drive units 225, e.g., one package at a time. In addition, the cart building station 130 may also include an imaging or scanning device to detect or capture a package identifier associated with a package that is grasped by the second robotic arm 233. By processing and identifying the package identifier using various image processing techniques or algorithms, various characteristics of the package including an identity, source, contents, destination, or other characteristics may be determined, e.g., by reference to a datastore or table storing data associated with package identifiers and their associated characteristics. The imaging or scanning device of the cart building station 130 may also detect or capture a first drive unit identifier associated with a first drive unit 225 from which the second robotic arm 233 has grasped the package. By processing and identifying the first drive unit identifier using various image processing techniques or algorithms, various characteristics of the first drive unit 225 including an identity, capabilities, or other characteristics may be determined, e.g., by reference to a datastore or table storing data associated with first drive unit identifiers and their associated characteristics. Furthermore, based on the previously stored association between the package identifier and the first drive unit identifier, the package may be identified based on the first drive unit identifier.

The second queue 227 may comprise one or more positions or locations adjacent or near the second robotic arm 233 of the cart building station 130. One or more first drive units 225-4, 225-5, 225-6 carrying packages may move into and/or through the positions of the second queue 227. Then, the second robotic arm 233 may grasp packages from the first drive units 225 to transfer to one or more carts 245-1, 245-2, 245-3 that are moved by second drive units.

Further, in response to grasping a package having a package identifier from a first drive unit having a first drive unit identifier, the package identifier may be disassociated from the first drive unit identifier, e.g., removed from a datastore or table. In this manner, the package sortation system may disassociate a package from a first drive unit from which the package was grasped or removed.

The third queue 237 may also comprise one or more positions or locations adjacent or near the second robotic arm 233 of the cart building station 130. One or more carts 245-1, 245-2, 245-3 may be coupled to and moved by second drive units into and/or through the positions of the third queue 237. Then, the second robotic arm 233 may transfer packages grasped from the first drive units 225 to one or more carts 245-1, 245-2, 245-3 that are moved by second drive units.

Each cart 245 may have an associated destination, such that each cart 245 may receive only packages having the same associated destination. In some example embodiments, a cart 245 may receive one package at a time, in which the package has the same associated destination as the cart 245. In other example embodiments, a cart 245 may receive a plurality of packages at a time, in which each of the plurality of packages may also have the same associated destination as the cart 245. Further, a cart 245 that is to receive a plurality of packages from the second robotic arm 233 may remain in one or more of the positions of the third queue 237 for a period of time, in order to receive the plurality of packages associated with a same destination as the destination associated with the cart during the period of time.

In some example embodiments, the cart building station 130 may include a buffer or storage zone or area configured to receive packages. For example, after grasping a package from a first drive unit 225, the second robotic arm 233 may temporarily place or store the package in a buffer zone. The buffer zone may be used to temporarily place or store a plurality of packages associated with a same destination, or a plurality of packages associated with respective one or more destinations. In one example use case of the buffer zone, a plurality of first drive units may move a plurality of packages having the same associated destination to a particular cart building station, and the second robotic arm may grasp and temporarily store the plurality of packages having the same associated destination in the buffer zone. Then, when a cart having the same associated destination is moved to the cart building station to receive packages, the second robotic arm may move the plurality of packages having the same associated destination from the buffer zone to the cart. In this manner, a plurality of packages may be loaded to a cart during a single trip to the cart building station, thereby improving speed and efficiency as compared to loading packages one by one to the cart over multiple trips to the same or multiple different cart building stations.

The imaging or scanning device of the cart building station 130 may also detect or capture a cart identifier associated with a cart 245 and/or a second drive unit identifier associated with a second drive unit that is coupled to and moving the cart 245 to receive packages from the second robotic arm 233. By processing and identifying the cart identifier and/or the second drive unit identifier using various image processing techniques or algorithms, various characteristics of the cart, including an identity, load status, contents, inject time, eject time, destination, or other characteristics may be determined, e.g., by reference to a datastore or table storing data associated with cart identifiers and their associated characteristics, and/or various characteristics of the second drive unit, including an identity, capabilities, or other characteristics may be determined, e.g., by reference to a datastore or table storing data associated with second drive unit identifiers and their associated characteristics.

Prior to moving the cart to the cart building station, in response to coupling to and moving a cart having a cart identifier by a second drive unit having a second drive unit identifier, the cart identifier may be associated with the second drive unit identifier, e.g., stored in a datastore or table. For example, the second drive units may include imaging or scanning sensors or devices that are positioned and oriented to detect and capture cart identifiers associated with carts, e.g., on an underside or lower portion of the carts. In this manner, the package sortation system may associate a cart with a second drive unit that is coupled to and moving the cart.

Further, in response to transferring a package having a package identifier to a cart having a cart identifier that is moved by a second drive unit having a second drive unit identifier, the package identifier may be associated with the cart identifier and/or the second drive unit identifier, e.g., stored in a datastore or table. In this manner, the package sortation system may associate a package with a cart that has received the package and/or with a second drive unit that is moving the cart.

A cart 245 that has received a package from the second robotic arm 233 of the cart building station 130 may then be navigated or moved within the sortation field 140 by a second drive unit that is coupled to and moving the cart 245. The sortation field 140 may comprise a structured or unstructured floor, area, or grid 242 upon which the second drive units navigate between the cart building station 130 and a cart transfer station 150. In example embodiments having a structured floor or grid 242, a plurality of identifiers, fiducials, codes, or other markers, such as barcodes, QR codes, text, characters, symbols, or other types of identifiers or codes, may be positioned at particular locations of the floor in order to aid navigation and movement of the second drive units. Further, the second drive units may include imaging or scanning sensors or devices that are positioned and oriented to detect and capture the identifiers or fiducials on the floor. In other example embodiments having an unstructured floor or area 242, the second drive units may include one or more sensors, such as GPS sensors, indoor positioning sensors, other position determination sensors, imaging sensors, RFID sensors, or other types of sensors, to navigate and move along the floor within the sortation field 140.

In some example embodiments, the second drive units may include some or all of the features of the first drive units, as further described herein. In further example embodiments, the first and second drive units may be substantially identical, such that they may be interchangeably deployed and used within either of the first drive unit field 120 or the sortation field 140.

The second drive units may move or navigate the carts 245 within the sortation field 140 to place, sort, store, retrieve, ship, or transfer the carts having one or more packages with associated destinations. As set forth herein, a second drive unit may maintain a cart 245 that is to receive a plurality of packages from the second robotic arm 233 in one or more of the positions of the third queue 237 for a period of time, in order to receive the plurality of packages associated with a same destination as the destination associated with the cart during the period of time. Alternatively, the cart 245 may remain in one or more of the positions of the third queue 237 for a period of time, whereas a second drive unit that moved to cart 245 to the third queue 237 may decouple from and leave the cart 245, in order to perform one or more other operations within the sortation field 140. When the cart 245 is to be removed from the third queue 237, the same or a different second drive unit may couple to and move the cart 245 to another portion of the sortation field 140.

The carts 245 within the sortation field 140 may be configured, arranged, sorted, or organized in various manners. Further, the carts 245 may be configured, arranged, sorted, or organized based on various characteristics associated with the packages, carts, destinations, facility or environment, or other characteristics. In one example embodiment, one or more rows, columns, or groups of carts 245 positioned relatively closer to the cart building stations 130 may comprise carts 245 having associated destinations that are in the process of being filled or loaded with packages. Further, carts 245 that may generally receive high velocity packages, e.g., packages that may need to be processed relatively faster through the package sortation system, may be positioned relatively closer to the cart building stations 130, whereas carts 245 that may generally receive low velocity packages, e.g., packages that may be processed relatively slower through the package sortation system, may be positioned relatively farther from the cart building stations 130.

In addition, one or more rows, columns, or groups of carts 245 that are relatively farther from the cart building stations 130 than those that are in the process of being filled or loaded may comprise empty carts having associated destinations that are waiting to begin the filling or loading process. Moreover, one or more rows, columns, or groups of carts 245 that are relatively farthest from the cart building stations 130 and/or relatively closest to the cart transfer stations 150 may comprise full or loaded carts having associated destinations, or carts having eject times that are close to or past the current time, that are ready to be transferred or in the process of being transferred out of the sortation field 140 via the cart transfer stations 150 and shipped to their associated destinations.

As described herein, each cart may have an associated destination, e.g., a region, area, zip code, or other type or group of locations or areas. Within the sortation field 140, one or more carts may have the same associated destination. In one example, there may be multiple carts configured to receive high velocity packages that are intended for the same destination. As a result, packages may be transferred and sorted to a particular destination using more than one cart building station 130 by moving carts having the same associated destination to different cart building stations 130. This may facilitate increased sort density, flexibility, and/or throughput using the package sortation system.

In additional example embodiments, carts 245 that may generally receive high velocity packages may be positioned closer to the cart building stations or in relatively more accessible positions or locations within the sortation field 140, such as along aisles or pathways, on edges or corners of groups of carts, in a central area of the sortation field 140, in designated high volume areas, or in other more accessible arrangements. In further example embodiments, carts 245 that may generally receive low velocity packages may be positioned farther from the cart building stations or in relatively less accessible positions or locations within the sortation field 140, such as hidden or embedded within groups of carts, on edges or sides of the sortation field 140, in designated low volume areas, or in other less accessible arrangements.

In order to eject full or loaded carts, or carts that have eject times that are close to or past the current time, the second drive units may couple to and move the carts 245 from the sortation field 140 to a plurality of cart transfer stations 150, via which the carts 245 may then move to one or more shipping or transport systems, e.g., freight containers, trailers, trucks, airplanes, boats, or other types of shipping or transport systems via one or more dock doors, e.g., outbound dock doors of the package sortation system. In addition, one or more empty carts may also be injected into the sortation field 140 via the plurality of cart transfer stations 150, and the second drive units may couple to and move the empty carts into the sortation field 140 for further processing, sorting, storage, and shipping of packages. Further details of the plurality of cart transfer stations 150 are described herein at least with respect to FIG. 4.

Although FIG. 2 illustrates a particular number, type, size, dimensions, configuration, and arrangement of portions of a package induct station, a first drive unit field, first drive units, a cart building station, carts, and a sortation field, other example embodiments of the package sortation system described herein may include various other numbers, types, sizes, dimensions, configurations, or arrangements of the various components or elements described herein.

Figure 3:
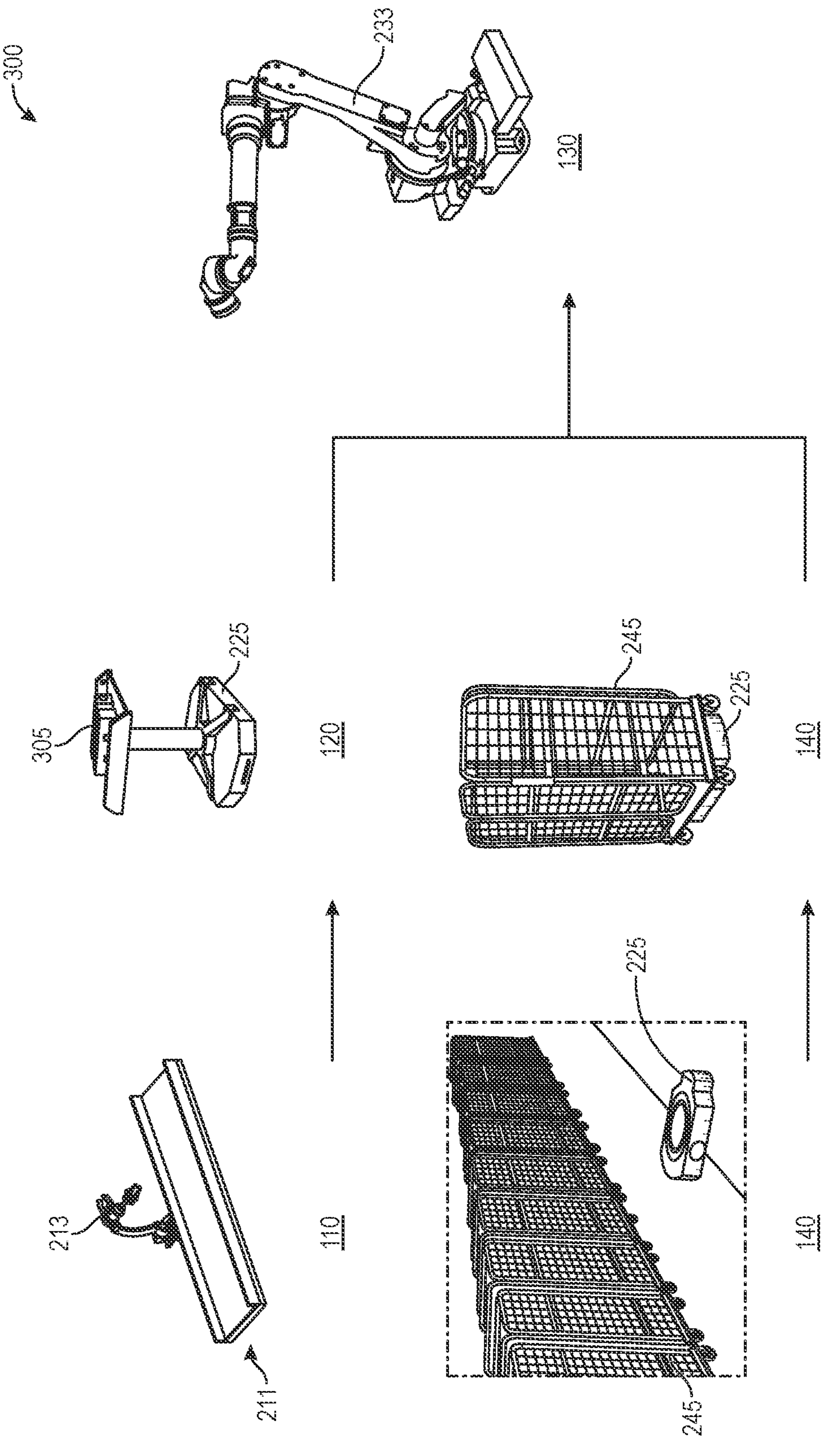
FIG. 3 is a schematic, flow diagram of an example package sortation system, in accordance with implementations of the present disclosure.

FIG. 3 is a schematic, flow diagram 300 of an example package sortation system, in accordance with implementations of the present disclosure.

As shown in FIG. 3, a package induct station 110 may comprise a conveyance mechanism, e.g., a conveyor 211, and a first robotic arm 213. For example, the first robotic arm 213 may comprise a six-axis robotic arm or manipulator, a robotic arm with different degrees of freedom, a gantry system, or other types of grasping mechanisms, and the first robotic arm 213 may have an associated end effector to grasp, lift, move, transfer, and release packages.

The first robotic arm 213 may grasp, lift, and transfer one or more packages from the conveyor 211 to a first drive unit 225 that moves within the first drive unit field 120. For example, a first drive unit 225, e.g., a robotic drive unit, may include a controller (such as the drive unit control system described with respect to FIG. 8), that may include a processor, a drive mechanism controller, a power supply, a memory, a lift mechanism controller, and a network interface or communication device.

In some example embodiments, the first drive unit 225 may not include a lift mechanism or associated controller. Instead, the first drive unit 225 may include an upper surface, a container, a tray, a bin, shelf, or other receptacle, or multiple containers, trays, bins, shelves, or other receptacles, configured to receive one or more packages. In some example embodiments, the first drive unit 225 may receive a plurality of packages having the same associated destination, e.g., in one or more containers, trays, bins, shelves, or other receptacles. In contrast to mezzanine sortation systems having limited available vertical height, the automated, single level, package sortation systems described herein may have relatively greater available vertical height, thereby enabling the use of drive units and associated containers, trays, bins, shelves, or receptacles having relatively greater height and associated available storage space to receive one or more packages.

In other example embodiments, the first drive unit 225 may receive a plurality of groups of packages, in which different groups may have different respective destinations, e.g., a first group having a first destination and received in a first container, tray, bin, shelf, or other receptacle, a second group having a second destination and received in a second container, tray, bin, shelf, or other receptacle, etc. In such examples, the first drive unit 225 may comprise a plurality of identifiers associated with respective containers, trays, bins, shelves, or other receptacles configured to receive different groups of packages, in order to store associations between a group of packages having an associated destination and a currently stored container, tray, bin, shelf, or other receptacle of the first drive unit 225.

Further, as shown in FIG. 3, various types of components or attachments may also be coupled to an upper portion of the first drive unit 225. For example, a pedestal and/or elevated surface 305 may be coupled to an upper portion of the first drive unit 225 to receive one or more packages. In addition, a conveyor segment, a cross belt sorter segment, a rotating tray or surface, a tilting tray or surface, or other types of components or attachments may be coupled to an upper portion of the first drive unit 225 to receive one or more packages.

The first drive unit 225 may receive one or more packages from the first robotic arm 213 and transfer the packages via the first drive unit field 120 to a cart building station 130. The cart building station 130 may comprise a second robotic arm 233. For example, the second robotic arm 233 may also comprise a six-axis robotic arm or manipulator, a robotic arm with different degrees of freedom, a gantry system, or other types of grasping mechanisms, and the second robotic arm 233 may have an associated end effector to grasp, lift, move, transfer, and release packages.

At the package induct station 110, one or more imaging or sensing devices may detect a package identifier of a package that is grasped, lifted, moved, and/or transferred by the first robotic arm 213, and/or may detect a drive unit identifier of a first drive unit 225 that is to receive the package. For example, the imaging or sensing devices may be associated with or proximate a portion of the package induct station to detect package identifiers and/or drive unit identifiers in proximity to the package induct station. Alternatively, the imaging or sensing devices may be associated with the first robotic arm 213 to detect package identifiers and/or drive unit identifiers during various operations of the first robotic arm 213.

Responsive to detecting a package identifier of a package that is grasped, lifted, moved, and/or transferred by the first robotic arm 213, a control system may determine a destination associated with the package. Based on the destination associated with the package, a cart building station 130 to which to move the package by the first drive unit 225 may be determined or selected. In addition, a cart 245 that is to receive the package from the first drive unit 225 may also be determined or selected based on the destination associated with the package.

The cart 245 that is selected to receive the package may be positioned at various locations within the sortation field 140. For example, the selected cart 245 may be associated with the same destination as the package. In addition, the cart 245 may be selected from a plurality of carts that are associated with the same destination as the package. In some example embodiments, the cart 245 may be selected based on various factors, such as position of the cart 245 within the sortation field 140, a proximity or distance to a selected cart building station 130, a load status of the cart 245, contents of the cart 245, an eject time of the cart 245, and/or various other factors.

In various example embodiments, the cart 245 may comprise a container, bin, tray, shelf, or other receptacle, or the cart 245 may comprise multiple containers, bins, trays, shelves, or other receptacles. For example, the cart 245 may comprise an inventory pod or container having a plurality of bins, cubbies, compartments, or storage locations to receive one or more packages. Alternatively or in addition, the cart 245 may comprise a shelving unit or structure having a plurality of shelves, containers, bins, trays, dividers, or storage locations to receive one or more packages. In contrast to mezzanine sortation systems having limited available vertical height, the automated, single level, package sortation systems described herein may have relatively greater available vertical height, thereby enabling the use of carts having relatively greater height and associated available storage space to receive one or more packages.

In one example cart as shown in FIG. 3, the cart 245 may include a base, a frame including one or more sides, one or more rollers or wheels, and/or one or more doors or closures. The base and frame may be coupled together to form a container, enclosure, or other at least partially enclosed volume of the cart that is configured to receive, carry, and/or transport one or more packages or objects. In addition, the cart may include one or more shelves or levels coupled or placed within the base and frame that are configured to receive, carry, and/or transport one or more packages or objects. The base, frame, and/or shelves may be formed of sheets, plates, wireframes, beams, or other structural elements, and the base, frame, and/or shelves may be formed of various materials, such as metals, wood, plastics, composites, other materials, or combinations thereof. The various portions of the base, frame, and/or shelves described herein may be coupled together via fasteners, adhesives, welds, or other types of connectors.

The rollers or wheels may be coupled to the base of the cart and enable movement of the cart within a facility, such as a material handling facility, warehouse, distribution center, sortation center, wholesale or retail facility, grocery store, or any other facility or environment. In example embodiments, a second drive unit, e.g., a robotic drive unit, may drive adjacent or under the cart, couple to a portion of the base or frame, and then move the cart either by pushing or pulling the cart on its wheels or by lifting and carrying the cart. The wheels described herein may be coupled to various portions of the base and/or frame via fasteners, adhesives, welds, or other types of connectors.

The doors may be movably and/or rotatably coupled to the frame of the cart. For example, the doors may be coupled to the frame via one or more hinges. The doors may move between open positions and closed positions. The doors may be formed of sheets, plates, wireframes, beams, or other structural elements, and the doors may be formed of various materials, such as metals, wood, plastics, composites, other materials, or combinations thereof. In example embodiments, a cart may include a single door that moves between open and closed positions. In other example embodiments, a cart may include two doors that open out and away from each other, and that close in and toward each other, e.g., double doors. In other example embodiments, a cart may include various other numbers, configurations, or arrangements of doors. Further, the one or more doors may be associated with sides of the cart to enable loading or unloading of packages via the sides, and/or the one or more doors may be associated with a top of the cart to enable loading or unloading of packages via the top. The various portions of the doors described herein may be coupled together via fasteners, adhesives, welds, or other types of connectors.

In addition, the cart building station 130 that is selected to transfer the package from the first drive unit 225 to the selected cart 245 may also be positioned at various locations within the package sortation system. For example, the selected cart building station 130 may be associated with the same destination as the package, and/or potentially one or more other destinations, e.g., a station that may be dedicated to carts associated with one or more destinations. In addition, the cart building station 130 may be selected from a plurality of cart building stations that may dynamically process carts associated with one or more different destinations, including the same destination as the package. In some example embodiments, the cart building station 130 may be selected based on various factors, such as position of the cart building station 130 within the package sortation system, a proximity or distance to a selected cart 245, capabilities of the cart building station 130, a processing time of the cart building station 130, size of queues or amount of delays associated with the cart building station 130, and/or various other factors.

Based on the selected cart 245, a second drive unit may move within the sortation field 140 and engage, couple to, lift, and/or move the selected cart 245. For example, a second drive unit, e.g., a robotic drive unit, may include any and all of the features of the first drive unit 225 described herein, including a controller (such as the drive unit control system described with respect to FIG. 8), that may include a processor, a drive mechanism controller, a power supply, a memory, a lift mechanism controller, and a network interface or communication device.

In some example embodiments, the second drive unit that couples to and moves carts within the sortation field 140 may include a lift mechanism comprising a screw drive, a geared mechanism, a linear actuator, or other actuators or mechanisms configured to cause vertical movement of a portion of the robotic drive unit and to engage, couple to, lift, and/or move a cart. In example embodiments, the second drive unit may releasably engage or couple to respective carts 245, such that the second drive unit may perform various tasks, such as coupling to, lifting, moving, lowering, placing, and uncoupling from respective carts 245 as desired. For example, in order to engage and move a respective cart 245, a second drive unit may position itself underneath the cart 245. Then, the lift mechanism may move vertically to engage with an underside of the cart and/or lift the cart 245. While the cart 245 is engaged via the lift mechanism, the second drive unit may move or transfer the cart 245 within the sortation field 140 and/or between the cart building stations 130 and the cart transfer stations 150 of the package sortation system. Upon reaching a destination location for the cart 245, the lift mechanism may again move vertically to disengage with the underside of the cart and/or lower the cart 245. In this manner, the second drive unit may engage, couple to, lift, move, lower, uncouple, and/or place a selected cart 245 within the sortation field 140 at the selected cart building station 130.

In example embodiments, at least a portion of the movement of the selected cart 245 by the second drive unit within the sortation field 140 to the cart building station 130 may occur concurrently or simultaneously with at least a portion of the movement of the first drive unit 225 with the package from the package induct station 110 via the first drive unit field 120 to the cart building station 130. In some example embodiments, the cart 245 and cart building station 130 may be selected such that the second drive unit moving the cart 245 and the first drive unit 225 with the package may arrive at the cart building station 130 substantially simultaneously, or within a threshold amount of time relative to each other.

At the selected cart building station 130, the second robotic arm 233 may grasp, lift, and/or move one or more packages from the first drive unit 225, and the second robotic arm 233 may transfer, place, and/or release the one or more packages to the selected cart 245 moved by the second drive unit. In addition, at the cart building station 130, one or more imaging or sensing devices may detect a package identifier of a package that is grasped, lifted, moved, and/or transferred by the second robotic arm 233, and/or may detect a drive unit identifier of a first drive unit 225 that is carrying and/or moving the package. Further, one or more imaging or sensing devices may detect a cart identifier of a cart 245 that is moved by a second drive unit, and/or may detect a drive unit identifier of a second drive unit that is carrying and/or moving the cart 245. For example, the imaging or sensing devices may be associated with or proximate a portion of the cart building station to detect package identifiers, drive unit identifiers, and/or cart identifiers in proximity to the cart building station. Alternatively, the imaging or sensing devices may be associated with the second robotic arm 233 to detect package identifiers, drive unit identifiers, and/or cart identifiers during various operations of the second robotic arm 233.

Responsive to transfer of the one or more packages to the cart 245 by the second robotic arm 233, the second drive unit may move, place, sort, store, and/or transfer the cart 245 with the packages to one or more locations within the sortation field 140. In addition, as further described herein, the second drive unit may transfer the cart 245 to a cart transfer station responsive to the cart 245 being full, and/or responsive to a current time being associated with an eject time of the cart 245 from the sortation field 140, e.g., a time at which the cart 245 is to be transferred to a downstream process or station such as shipping or transport to an associated destination.

In addition, the first and second drive units, and respective drive unit control systems, may be in communication with a control system (such as the control system described with respect to FIG. 9), that may be configured to send and/or receive commands, instructions, and/or data to control and coordinate operations of the first and second drive units, as well as other portions of the package sortation system, such as conveyance mechanisms, robotic arms, package induct stations, cart building stations, cart transfer stations, imaging or sensing devices, and/or various other portions of the package sortation system. Further, the first and second drive units may move relative to various locations within the environment based in part on fiducial markers, e.g., barcodes, QR codes, characters, symbols, RFID tags, or other identifiers, on the floors, fields, areas, grids, regions, and/or queues adjacent to various stations that are detected by one or more sensors of the first and second drive units. Example sensors configured to detect fiducial markers may comprise imaging sensors, infrared sensors, RFID readers, or other types of sensors.

In other example embodiments, one or more imaging sensors may also be associated with various positions or locations within the environment, such that imaging data captured by such imaging sensors may be processed to detect various robotic drive units and their respective locations, with or without reference to fiducial markers or identifiers associated with particular locations. In additional example embodiments, one or more laser sensors, photoeyes, proximity sensors, radio transmitters and/or receivers, radio beacons, or other types of presence detection sensors may be associated with various positions or locations within the environment, such that presence detection data captured by such sensors may be processed to detect various robotic drive units at particular locations, with or without reference to fiducial markers or identifiers associated with particular locations. In further example embodiments, robotic drive units may include motor or wheel encoders associated with drive mechanisms that are configured to measure or detect rotations of motors and/or wheels, in order to determine movements and locations of robotic drive units based on dead reckoning by processing rotation data measured by such encoders. In still further example embodiments, one or more RFID tags may be associated with particular locations within the environment, and RFID readers associated with robotic drive units may detect RFID tags to determine respective locations of robotic drive units, and/or conversely, one or more RFID tags may be associated with particular robotic drive units, and RFID readers associated with various locations within the environment may detect RFID tags to determine respective locations of robotic drive units. Various other types of sensors, as well as combinations of two or more different types of sensors, may be used to measure, detect, and determine movements and locations of robotic drive units within the environment, in order to control and coordinate, e.g., by a controller, operations of robotic drive units within the environment and with respect to the package sortation system.

In other example embodiments, the first and second drive units may have various other shapes, sizes, configurations, or arrangements. For example, although the first and second drive units are described herein as including substantially the same features, in other example embodiments, the first and second drive units may be sized or shaped in different configurations or arrangements. In some example embodiments, the first drive units may be configured to more efficiently receive and transfer packages within the first drive unit field and/or between the package induct stations and cart building stations, whereas the second drive units may be configured to more efficiently engage and move carts within the sortation field and/or between the cart building stations and cart transfer stations.

Figure 4:
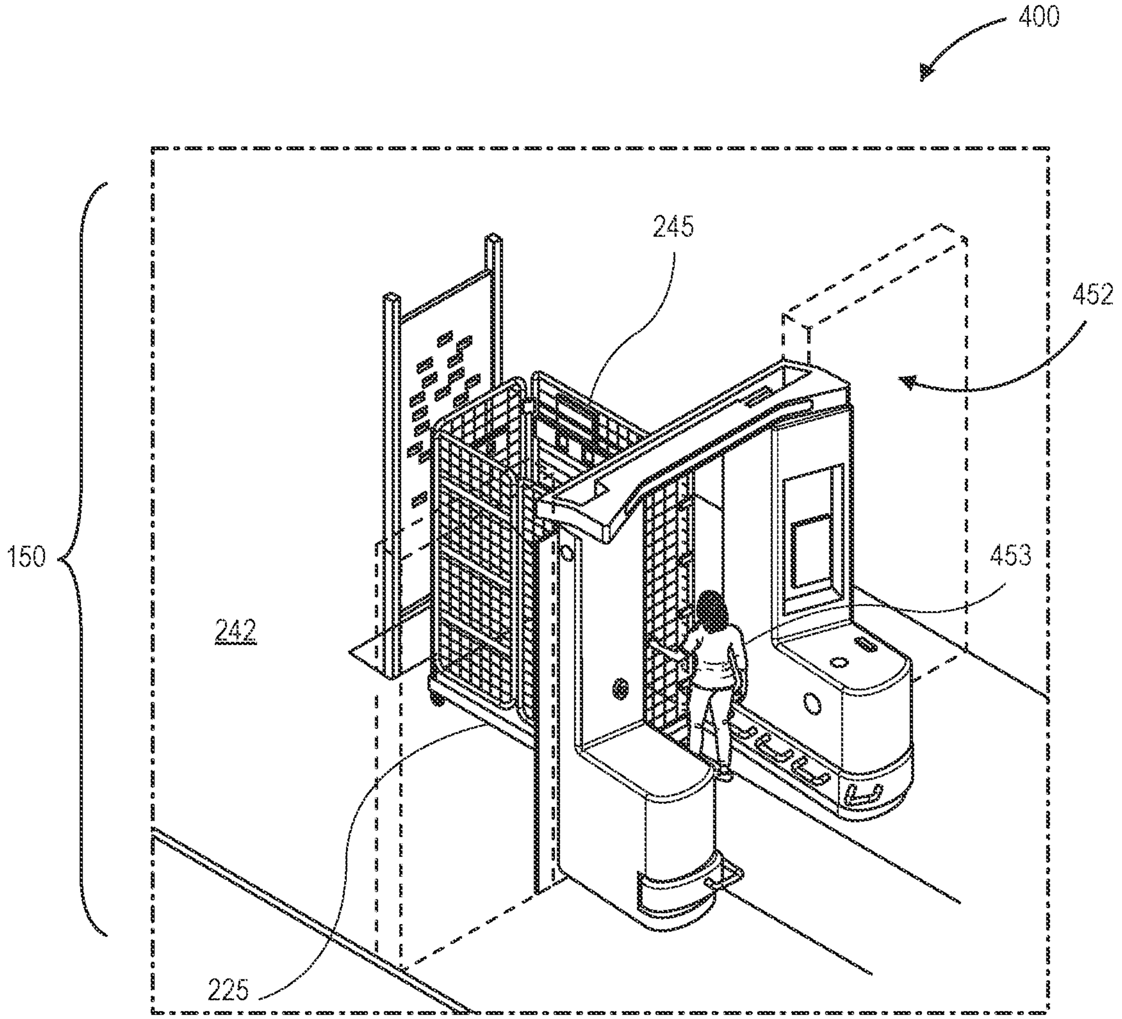
FIG. 4 is a schematic, perspective view diagram of another example portion of a package sortation system, in accordance with implementations of the present disclosure.

FIG. 4 is a schematic, perspective view diagram 400 of another example portion of a package sortation system, in accordance with implementations of the present disclosure.

As shown in FIG. 4, a cart transfer station 150 may be positioned at an edge or periphery of the floor, area, or grid 242 of the sortation field 140 in which second drive units 225 may engage, lift, move, sort, store, lower, place, and/or transfer carts 245 and packages contained therein having associated destinations.

A control system may determine that a cart 245 is to be ejected or retrieved from the sortation field 140 via a cart transfer station 150. For example, responsive to a cart 245 having a full load status, e.g., being substantially fully loaded with packages having the same destination, a second drive unit 225 may be instructed to engage, lift, and/or retrieve the cart 245 and then move and/or transfer the cart 245 to a cart transfer station 150. In addition, responsive to a current time being associated with an eject time of the cart 245 from the sortation field 140, e.g., a time at which the cart 245 and packages contained therein are to be transferred to a downstream process or station such as shipping or transport to an associated destination, a second drive unit 225 may be instructed to engage, lift, and/or retrieve the cart 245 and then move and/or transfer the cart 245 to a cart transfer station 150.

The cart transfer station 150 may include one or more walls, partitions, dividers, or other structures 452 to maintain separation between the sortation field 140 and other portions of a facility or environment. For example, in some example embodiments, human agents 453 may operate within or utilize portions of the facility or environment outside of the sortation field 140, and the walls or partitions 452 may ensure the safety of such human agents 453 by preventing entry into the sortation field 140. In other example embodiments, one or more robotic or automated machines, equipment, or systems may form a part of the cart transfer station 150 to enable transfer of the cart 245 between the sortation field 140 and other portions of the facility or environment.

In addition, the cart transfer station 150 that is selected to transfer the cart 245 from the sortation field 140 to other portions of the facility or environment, e.g., outbound dock doors, shipping or transport systems, or other downstream processes or systems, may be positioned at various locations within the package sortation system. For example, the selected cart transfer station 150 may be associated with the same destination as the package, and/or potentially one or more other destinations, e.g., a station that may be dedicated to carts associated with one or more destinations. In addition, the cart transfer station 150 may be selected from a plurality of cart transfer stations that may dynamically process carts associated with one or more different destinations, including the same destination as the package. In some example embodiments, the cart transfer station 150 may be selected based on various factors, such as position of the cart transfer station 150 within the package sortation system, a proximity or distance to a selected cart 245, a proximity or distance to an outbound dock door, a shipping or transport system, or other downstream process or system, capabilities of the cart transfer station 150, a processing time of the cart transfer station 150, size of queues or amount of delays associated with the cart transfer station 150, and/or various other factors.

At the selected cart transfer station 150, a human agent 453 and/or one or more robotic drive units, autonomous vehicles, or other robotic or automated machines, equipment, or systems may cause transfer of the cart 245 from the sortation field 140 to other portions of the facility or environment. In some example embodiments, a robotic drive unit, e.g., second drive unit 225, may transfer the cart 245 from the sortation field 140 via the cart transfer station 150 and directly to other portions of the facility or environment, e.g., outbound dock doors, staging or buffer zones for carts, freight or shipping containers, or other downstream systems or processes. In other example embodiments, one or more other robotic drive units or autonomous vehicles may engage or couple to the cart 245 at the cart transfer station 150, and then transfer the cart 245 directly to other portions of the facility or environment, e.g., outbound dock doors, staging or buffer zones for carts, freight or shipping containers, or other downstream systems or processes. Various combinations of human agents, robotic drive units, autonomous vehicles, or other robotic or automated machines, equipment, or systems may transfer carts between and among the sortation field, cart transfer stations, and/or downstream systems or processes.

In addition, at the cart transfer station 150, one or more imaging or sensing devices may detect a cart identifier associated with the cart 245, may detect package identifiers of one or more packages contained in the cart 245, and/or may detect a drive unit identifier of a second drive unit that is carrying and/or moving the cart 245. For example, the imaging or sensing devices may be associated with or proximate a portion of the cart transfer station to detect package identifiers, drive unit identifiers, and/or cart identifiers in proximity to the cart transfer station. Alternatively, the imaging or sensing devices may be associated with or utilized by human agents 453 and/or robotic or automated machines or equipment to detect package identifiers, drive unit identifiers, and/or cart identifiers during various operations of the cart transfer station.

In additional example embodiments, a control system may determine that an empty cart is to be injected or added to the sortation field 140 via a cart transfer station 150. For example, responsive to removal of a cart, responsive to having available space within the sortation field 140, and/or responsive to determining a need for a cart that is associated with a particular destination within the sortation field 140, a human agent 453 and/or one or more robotic or automated machines, equipment, or systems may cause transfer of an empty cart to the cart transfer station 150. In addition, the empty cart may have an associated destination, e.g., stored in a data store or table. Then, a second drive unit 225 may be instructed to engage, lift, and/or retrieve the empty cart from the cart transfer station 150, and then move, sort, store, transfer, and/or place the empty cart at a position or location within the sortation field 140 of the package sortation system. Subsequently, one or more packages having the same associated destination as the empty cart may be sorted, stored, or transferred to the empty cart, as described herein.

At the selected cart transfer station 150, a human agent 453 and/or one or more robotic drive units, autonomous vehicles, or other robotic or automated machines, equipment, or systems may cause transfer of the empty cart from other portions of the facility or environment to the sortation field 140. In some example embodiments, a robotic drive unit, e.g., second drive unit 225, may transfer the empty cart directly from other portions of the facility or environment, e.g., storage or buffer zones for empty carts, freight or shipping containers, or other upstream systems or processes, via the cart transfer station 150 to the sortation field 140. In other example embodiments, one or more other robotic drive units or autonomous vehicles may engage or couple to the empty cart at other portions of the facility or environment, and then transfer the empty cart directly to the cart transfer station 150, at which a robotic drive unit, e.g., second drive unit 225, may couple to and move the empty cart to the sortation field 140. Various combinations of human agents, robotic drive units, autonomous vehicles, or other robotic or automated machines, equipment, or systems may transfer empty carts between and among upstream systems or processes, cart transfer stations, and/or the sortation field.

In addition, at the cart transfer station 150, one or more imaging or sensing devices may detect a cart identifier associated with the empty cart, and/or may detect a drive unit identifier of a second drive unit that is to carry and/or move the empty cart. For example, the imaging or sensing devices may be associated with or proximate a portion of the cart transfer station to detect drive unit identifiers and/or cart identifiers in proximity to the cart transfer station. Alternatively, the imaging or sensing devices may be associated with or utilized by human agents 453 and/or robotic or automated machines or equipment to detect drive unit identifiers and/or cart identifiers during various operations of the cart transfer station.

Although FIG. 4 illustrates a particular number, type, size, dimensions, configuration, and arrangement of a cart transfer station, other example embodiments of the package sortation system described herein may include various other numbers, types, sizes, dimensions, configurations, or arrangements of the various components or elements described herein.

Figure 5:
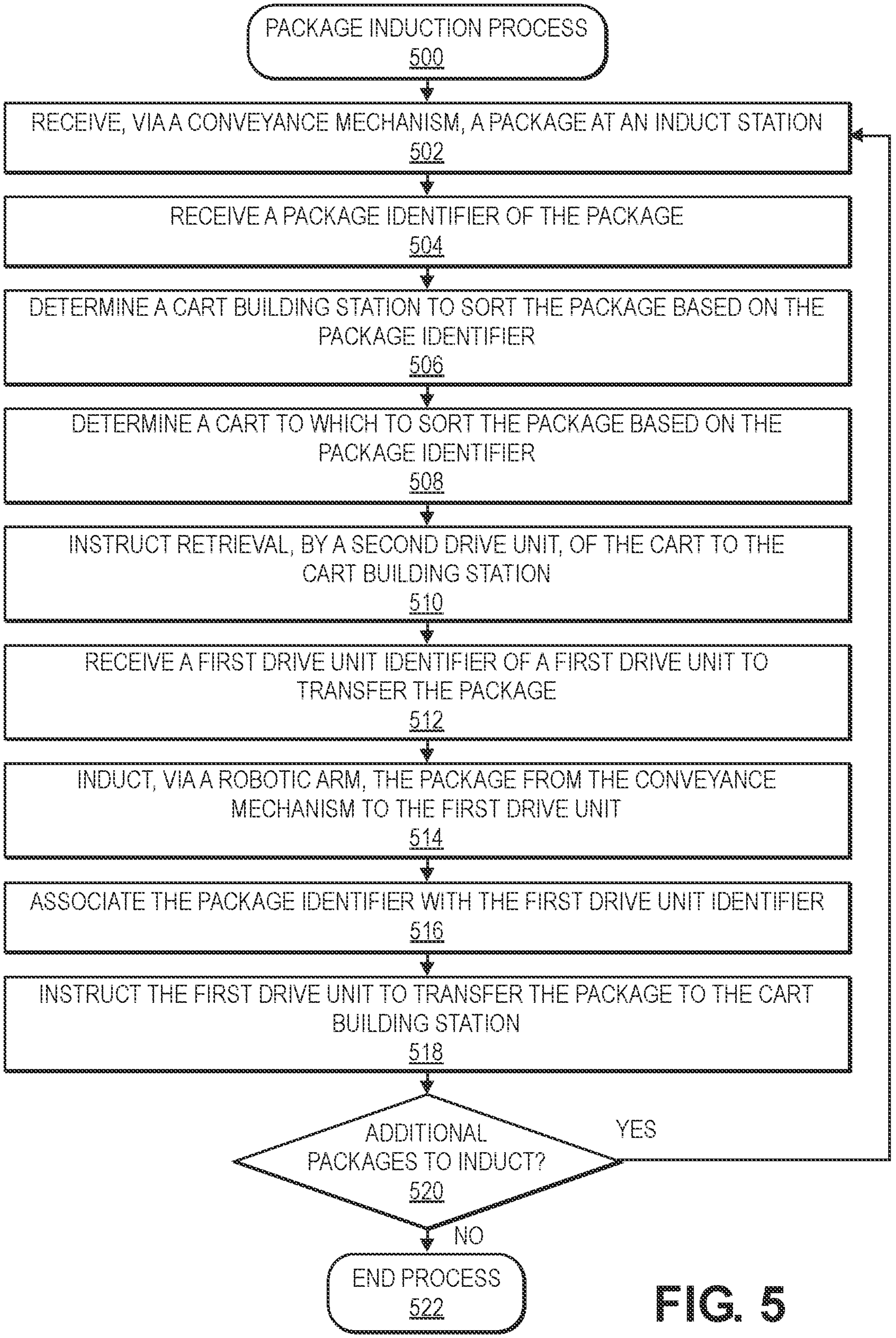
FIG. 5 is a flow diagram illustrating an example package induction process, in accordance with implementations of the present disclosure.

FIG. 5 is a flow diagram illustrating an example package induction process 500, in accordance with implementations of the present disclosure.

The process 500 may begin by receiving, via a conveyance mechanism, a package at an induct station, as at 502. For example, a conveyance mechanism, such as a conveyor, chute, slide, or other mechanism, may transfer a package from an upstream process or system to a package induct station. A plurality of packages may be conveyed or transferred to a plurality of package induct stations of a package sortation system. Each of the packages may have an associated package identifier and an associated destination, which may be stored in a data store or table. Further, a control system may instruct or command transfer of the package via a conveyor to a package induct station.

The process 500 may continue by receiving a package identifier of the package, as at 504. For example, one or more imaging or scanning sensors may be associated with a portion of the package induct station and/or a robotic arm of the package induct station. The one or more imaging or scanning sensors may capture or detect a package identifier of the package, in which the package identifier may comprise a barcode, a QR code, text, characters, symbols, or other types of identifiers or codes. Based on the detected and identified package identifier, a destination associated with the package may be determined with reference to a data store or table. Further, a control system may instruct or command scanning and identification of the package identifier of the package.

The process 500 may proceed by determining a cart building station to sort the package based on the package identifier, as at 506. For example, a cart building station may be selected from a plurality of cart building stations of the package sortation system. Based on the package identifier and the associated destination of the package, the cart building station may be selected to sort the package to a cart. In some example embodiments, the cart building station may be dedicated to sorting packages to the destination associated with the package, and/or the cart building station may be dynamically assigned to sort packages to the destination associated with the package. The cart building station may be selected based on various factors, such as position of the cart building station within the package sortation system, a proximity or distance to a selected cart, capabilities of the cart building station, a processing time of the cart building station, size of queues or amount of delays associated with the cart building station, and/or various other factors. Further, a control system may select or determine a cart building station to sort the package.

The process 500 may continue to determine a cart to which to sort the package based on the package identifier, as at 508. For example, a cart may be selected from a plurality of carts of the package sortation system. Based on the package identifier and the associated destination of the package, a cart that is associated with the same destination may be selected to which to sort the package. In some example embodiments, a plurality of carts may be associated with the same destination as the package, and one of the carts may be selected from the plurality of carts associated with the same destination. The cart may be selected based on various factors, such as position of the cart within the sortation field, a proximity or distance to a selected cart building station, a load status of the cart, contents of the cart, an eject time of the cart, and/or various other factors. Further, a control system may select or determine a cart to which to sort the package.

The process 500 may then proceed to instruct retrieval, by a second drive unit, of the cart to the cart building station, as at 510. For example, a second drive unit within the sortation field may be instructed to engage with and move the selected cart from a position within the sortation field to the selected cart building station. As described herein, the second drive unit may navigate the sortation field using various position determination methods, may detect and identify the selected cart via a cart identifier, and may couple to, lift, and/or move the selected cart to the selected cart building station. The cart identifier may comprise a barcode, a QR code, text, characters, symbols, or other types of identifiers or codes. In addition, the cart identifier and a second drive unit identifier may be associated with each other, e.g., stored in a data store or table. In this manner, the cart and second drive unit may be associated with each other to facilitate downstream identification and processing. Further, a control system may instruct the second drive unit to retrieve and move the selected cart to the selected cart building station, and may store the association of respective identifiers in a data store or table.

The process 500 may continue with receiving a first drive unit identifier of a first drive unit to transfer the package, as at 512. For example, a first drive unit within the first drive unit field may be instructed to navigate to the package induct station to receive the package. At the package induct station, one or more imaging or scanning sensors associated with a portion of the package induct station and/or a robotic arm of the package induct station may capture or detect a first drive unit identifier of the first drive unit. The first drive unit identifier may comprise a barcode, a QR code, text, characters, symbols, or other types of identifiers or codes. Based on the detected and identified first drive unit identifier, one or more characteristics associated with the first drive unit may be determined with reference to a data store or table. Further, a control system may instruct or command scanning and identification of the first drive unit identifier of the first drive unit.

The process 500 may proceed with inducting, via a robotic arm, the package from the conveyance mechanism to the first drive unit, as at 514. For example, the robotic arm of the package induct station may grasp, lift, move, and/or transfer the package from the conveyance mechanism to the first drive unit. As described herein, the robotic arm may comprise a six-axis robotic arm or manipulator, a robotic arm with different degrees of freedom, a gantry system, or other types of grasping mechanisms, and the robotic arm may have an associated end effector to grasp, lift, move, transfer, and release packages. The robotic arm may release or place the package on an upper surface, container, tray, bin, receptacle, or other component of the first drive unit that is configured to receive one or more packages. Further, a control system may instruct or command the robotic arm to induct the package from a conveyor to a first drive unit.

The process 500 may then continue by associating the package identifier with the first drive unit identifier, as at 516. For example, responsive to transferring the package to the first drive unit, the package identifier and the first drive unit identifier may be associated with each other, e.g., stored in a data store or table. In this manner, the package and first drive unit may be associated with each other to facilitate downstream identification and processing. Further, a control system may instruct or command the association between the package and the first drive unit, and may store the association of respective identifiers in a data store or table.

The process 500 may proceed by instructing the first drive unit to transfer the package to the cart building station, as at

518. For example, the first drive unit within the first drive unit field may be instructed to move the received package from the package induct station to the selected cart building station. As described herein, the first drive unit may navigate the first drive unit field using various position determination methods to arrive at the selected cart building station. Further, a control system may instruct the first drive unit to transfer the received package to the selected cart building station.

The process 500 may then determine whether there are additional packages to induct, as at 520. For example, a plurality of packages may be transferred via the conveyance mechanism to a plurality of package induct stations, and a plurality of first drive units may navigate within the first drive unit field and between the plurality of package induct stations and the plurality of cart building stations. Further, a control system may determine whether any additional packages are to be inducted.

If it is determined that there are additional packages to induct, the process 500 may return to step 502 to induct one or more additional packages. If, however, there are no additional packages to induct, the process 500 may then end, as at 522.

Figure 6:
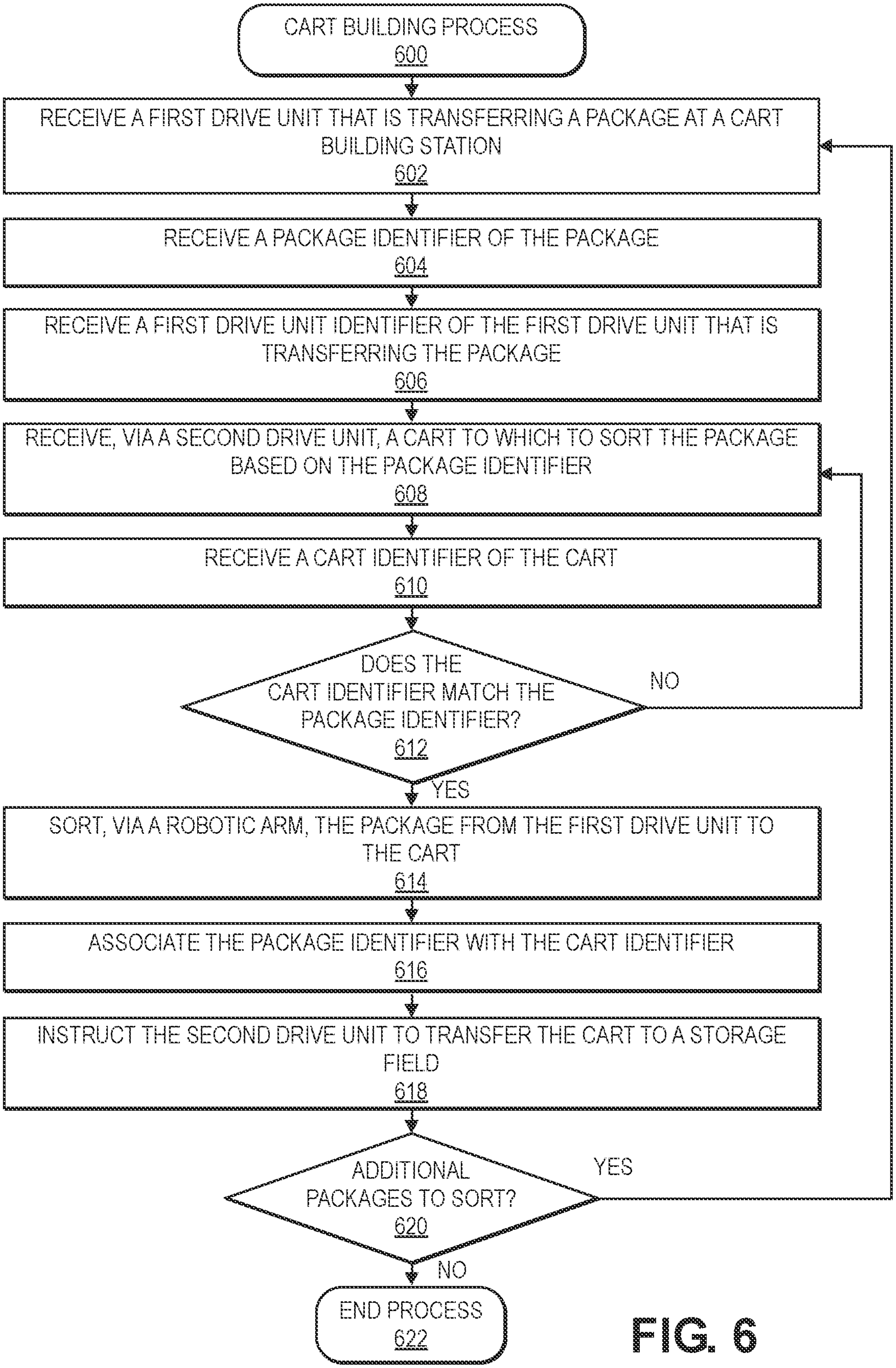
FIG. 6 is a flow diagram illustrating an example cart building process, in accordance with implementations of the present disclosure.

FIG. 6 is a flow diagram illustrating an example cart building process 600, in accordance with implementations of the present disclosure.

The process 600 may begin by receiving a first drive unit that is transferring a package at a cart building station, as at 602. For example, a first drive unit within the first drive unit field may be instructed to move a received package from a package induct station to the selected cart building station. As described herein, the first drive unit may navigate the first drive unit field using various position determination methods to arrive at the selected cart building station. Further, a control system may instruct the first drive unit to transfer the received package to the selected cart building station.

The process 600 may continue by receiving a package identifier of the package, as at 604. For example, one or more imaging or scanning sensors may be associated with a portion of the cart building station and/or a robotic arm of the cart building station. The one or more imaging or scanning sensors may capture or detect a package identifier of the package, in which the package identifier may comprise a barcode, a QR code, text, characters, symbols, or other types of identifiers or codes. Based on the detected and identified package identifier, a destination associated with the package may be determined with reference to a data store or table. Further, a control system may instruct or command scanning and identification of the package identifier of the package.

The process 600 may proceed by receiving a first drive unit identifier of the first drive unit that is transferring the package, as at 606. For example, one or more imaging or scanning sensors associated with a portion of the cart building station and/or a robotic arm of the cart building station may capture or detect a first drive unit identifier of the first drive unit. The first drive unit identifier may comprise a barcode, a QR code, text, characters, symbols, or other types of identifiers or codes. Based on the detected and identified first drive unit identifier, one or more characteristics associated with the first drive unit may be determined with reference to a data store or table. In addition, based on the stored association between the package identifier and the first drive unit identifier, a package carried by the first drive unit may be identified based on an identification of the first drive unit. Further, a control system may instruct or command scanning and identification of the first drive unit identifier of the first drive unit.

The process 600 may continue to receive, via a second drive unit, a cart to which to sort the package based on the package identifier, as at 608. For example, a second drive unit within the sortation field may be instructed to engage with and move a selected cart from a position within the sortation field to the selected cart building station. As described herein, the second drive unit may navigate the sortation field using various position determination methods, may detect and identify the selected cart via a cart identifier, and may couple to, lift, and/or move the selected cart to the selected cart building station. The cart identifier may comprise a barcode, a QR code, text, characters, symbols, or other types of identifiers or codes. Further, a control system may instruct the second drive unit to retrieve and move the selected cart to the selected cart building station.

The process 600 may proceed to receive a cart identifier of the cart, as at 610. For example, one or more imaging or scanning sensors associated with a portion of the cart building station and/or a robotic arm of the cart building station may capture or detect a cart identifier of the selected cart. The cart identifier may comprise a barcode, a QR code, text, characters, symbols, or other types of identifiers or codes. Based on the detected and identified cart identifier, one or more characteristics associated with the cart may be determined with reference to a data store or table, e.g., a destination associated with the cart. Further, a control system may instruct or command scanning and identification of the cart identifier of the cart.

The process 600 may continue with determining whether the cart identifier matches the package identifier, as at 612. For example, the package identifier may be associated with a destination, and the cart identifier may also be associated with a destination. A control system may determine whether the destination associated with the package identifier matches the destination associated with the cart identifier, such that the package may be sorted to the selected cart. If it is determined that the cart identifier does not match the package identifier, then the process 600 may return to step 608 to receive another cart and associated cart identifier to which the package may be sorted, provided the respective destinations of the package and cart match.

If, however, it is determined that the cart identifier does match the package identifier, the process 600 may proceed with sorting, via a robotic arm, the package from the first drive unit to the cart, as at 614. For example, the robotic arm of the cart building station may grasp, lift, move, and/or transfer the package from the first drive unit to the selected cart. As described herein, the robotic arm may comprise a six-axis robotic arm or manipulator, a robotic arm with different degrees of freedom, a gantry system, or other types of grasping mechanisms, and the robotic arm may have an associated end effector to grasp, lift, move, transfer, and release packages. The robotic arm may release or place the package on or within a portion of the cart that is configured to receive one or more packages. Further, a control system may instruct or command the robotic arm to sort the package from a first drive unit to a selected cart.

The process 600 may then continue by associating the package identifier with the cart identifier, as at 616. For example, responsive to transferring the package to the selected cart, the package identifier and the cart identifier may be associated with each other, e.g., stored in a data store or table. In this manner, the package and cart may be associated with each other to facilitate downstream identification and processing. In addition, the package identifier and the first drive unit identifier may be disassociated from each other, e.g., removed from a data store or table. In this manner, the package and first drive unit may be disassociated from each other to facilitate further processing. Further, a control system may instruct or command the association between the package and the cart, may instruct or command the disassociation between the package and the first drive unit, and may store the associations of respective identifiers in a data store or table.

The process 600 may proceed by instructing the second drive unit to transfer the cart to a storage field, as at 618. For example, the second drive unit may be instructed to move the cart with the received package from the selected cart building station to a position or location within the sortation or storage field. As described herein, the second drive unit may navigate using various position determination methods to move within the sortation field and between the cart building stations and cart transfer stations. Further, a control system may instruct or command the second drive unit to transfer the cart with received package from the selected cart building station to a position within the sortation field.

The process 600 may then determine whether there are additional packages to sort, as at 620. For example, a plurality of packages may be transferred via a plurality of first drive units to a plurality of cart building stations, and a plurality of second drive units may engage and move a plurality of carts within the sortation field and between the plurality of cart building stations and the plurality of cart transfer stations. Further, a control system may determine whether any additional packages are to be sorted.

If it is determined that there are additional packages to sort, the process 600 may return to step 602 to sort one or more additional packages. If, however, there are no additional packages to sort, the process 600 may then end, as at 622.

Figure 7:
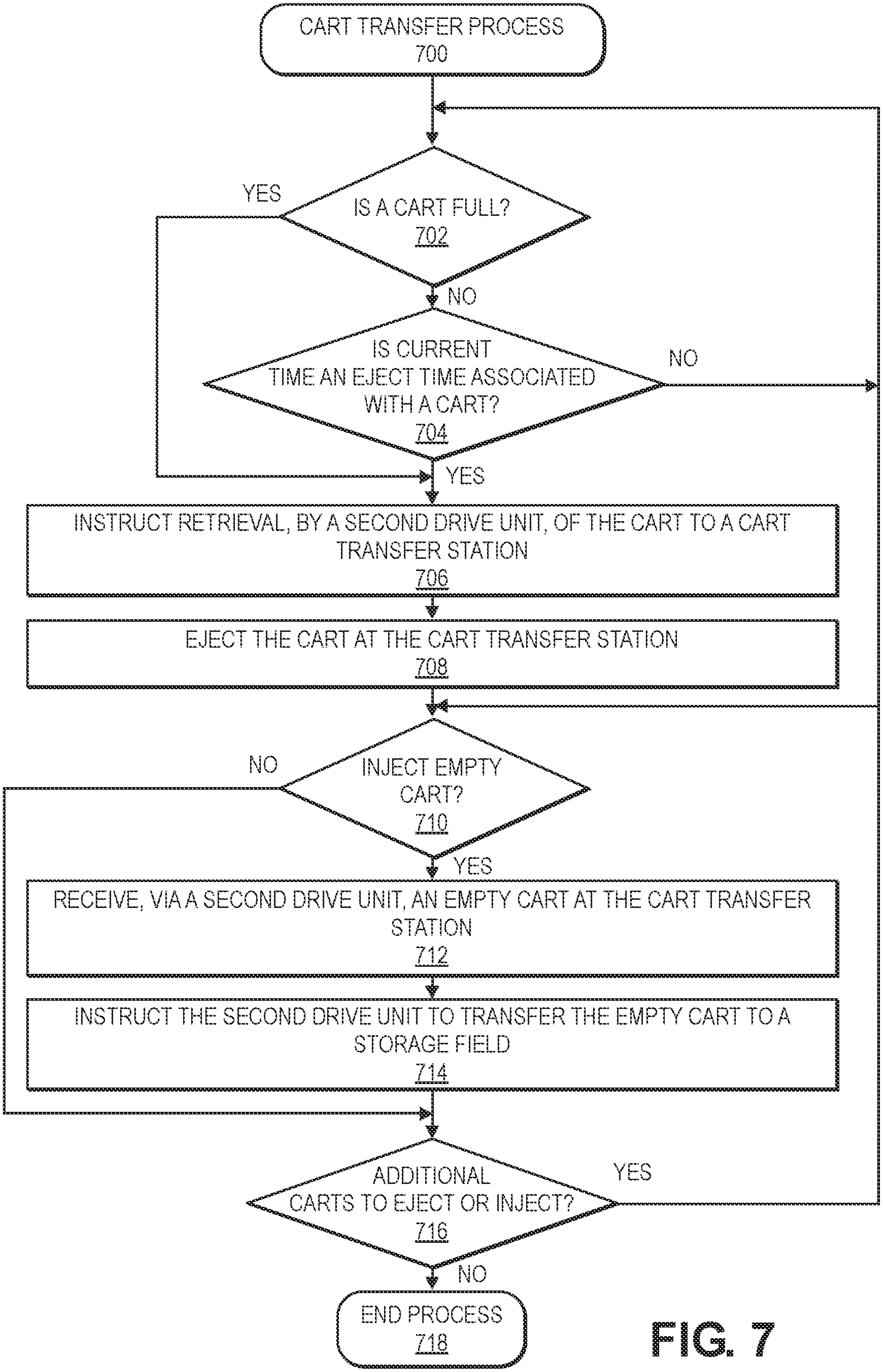
FIG. 7 is a flow diagram illustrating an example cart transfer process, in accordance with implementations of the present disclosure.

FIG. 7 is a flow diagram illustrating an example cart transfer process 700, in accordance with implementations of the present disclosure.

The process 700 may begin by determining whether a cart is full, as at 702. For example, a load status of a cart may be stored in association with the cart identifier, e.g., stored in a data store or table. The load status may indicate a number of packages, contents, weight, capacity, a level, amount, or percent of fullness or emptiness, or other aspects related to the load status of the cart. Further, a control system may determine the load status of the cart.

If it is determined that the cart is not full, or not within a threshold amount or percent of full, the process 700 may continue by determining whether a current time is an eject time associated with the cart, as at 704. For example, an eject time associated with a cart may also be stored in associated with the cart identifier, e.g., stored in a data store or table. The eject time may indicate a time to remove the cart from the sortation field, a time to transfer the cart to a downstream process or system, a shipping or transport time associated with the cart, or another time at or by which the cart should be transferred out of the sortation field. Further, a control system may determine whether a current time is an eject time associated with the cart.

If it is determined that the current time is not the eject time, or not within a threshold time of the eject time, the process 700 may return to step 702 to continue to determine whether a cart is full or whether a current time is an eject time associated with a cart.

If, however, it is determined that the load status of the cart is full, or within a threshold amount or percent of full, or it is determined that the current time is the eject time, or within a threshold time of the eject time, the process 700 may proceed by instructing retrieval, by a second drive unit, of the cart to a cart transfer station, as at 706. For example, a second drive unit may be instructed to engage with and move the cart that is full or is to be ejected from within the sortation field to a cart transfer station. The cart transfer station may be selected based on various factors, such as position of the cart transfer station within the package sortation system, a proximity or distance to a selected cart, a proximity or distance to an outbound dock door, a shipping or transport system, or other downstream process or system, capabilities of the cart transfer station, a processing time of the cart transfer station, size of queues or amount of delays associated with the cart transfer station, and/or various other factors. As described herein, the second drive unit may navigate using various position determination methods to move within the sortation field and to the cart transfer station. Further, a control system may instruct the second drive unit to transfer the cart that is full or is to be ejected to a cart transfer station.

The process 700 may continue to eject the cart at the cart transfer station, as at 708. For example, the second drive unit may lower, place, and/or release the cart at the cart transfer station, and one or more human agents, robotic or automated machinery or equipment, or other material handling equipment may transfer the cart out of the sortation field via the cart transfer station. Then, the cart may be moved or transferred to one or more downstream processes or systems, such as various types of shipping systems to transport the cart to an associated destination. Further, a control system may instruct or command one or more agents, machinery, or equipment to eject the cart at the cart transfer station.

The process 700 may proceed to determine whether to inject an empty cart, as at 710. For example, one or more empty carts may be injected or added into the sortation field via the cart transfer station. One or more human agents, robotic or automated machinery or equipment, or other material handling equipment may inject or add an empty cart to the sortation field for various reasons, such as responsive to removal of a cart that is full or otherwise to be ejected, responsive to having available space within the sortation field, and/or responsive to determining a need for a cart that is associated with a particular destination within the sortation field. In addition, the empty cart may have an associated destination, e.g., stored in a data store or table. Further, a control system may instruct or command one or more agents, machinery, or equipment to inject an empty cart at the cart transfer station.

The process 700 may then continue with receiving, via a second drive unit, an empty cart at the cart transfer station, as at 712. For example, a second drive unit may be instructed to engage with, lift, and/or carry the empty cart that is added at the cart transfer station by one or more agents, machinery, or equipment. Further, a control system may instruct the second drive unit to engage the empty cart at the cart transfer station.

The process 700 may proceed with instructing the second drive unit to transfer the empty cart to a storage field, as at 714. For example, the second drive unit may be instructed to move the empty cart from the cart transfer station to a position or location within the sortation or storage field and/or to a selected cart building station. As described herein, the second drive unit may navigate using various position determination methods to move within the sortation field and between the cart building stations and cart transfer stations. Further, a control system may instruct or command the second drive unit to transfer the empty cart from the cart transfer station to a position within the sortation field.

The process 700 may then determine whether there are additional carts to eject or inject, as at 716. For example, a plurality of carts that are full or to be ejected may be transferred via a plurality of second drive units from positions or locations within the sortation field to a plurality of cart transfer stations, and a plurality of empty carts may be transferred via a plurality of second drive units from the plurality of cart transfer stations to positions or locations within the sortation field. Further, various agents, machinery, or equipment may eject and/or inject carts via the plurality of cart transfer stations. Further, a control system may determine whether any additional carts are to be ejected or injected.

If it is determined that there are additional carts to eject or inject, the process 700 may return to step 702 to eject one or more additional full carts, and/or to step 710 to inject one or more additional empty carts. If, however, there are no additional carts to eject or inject, the process 700 may then end, as at 718.

Figure 8:
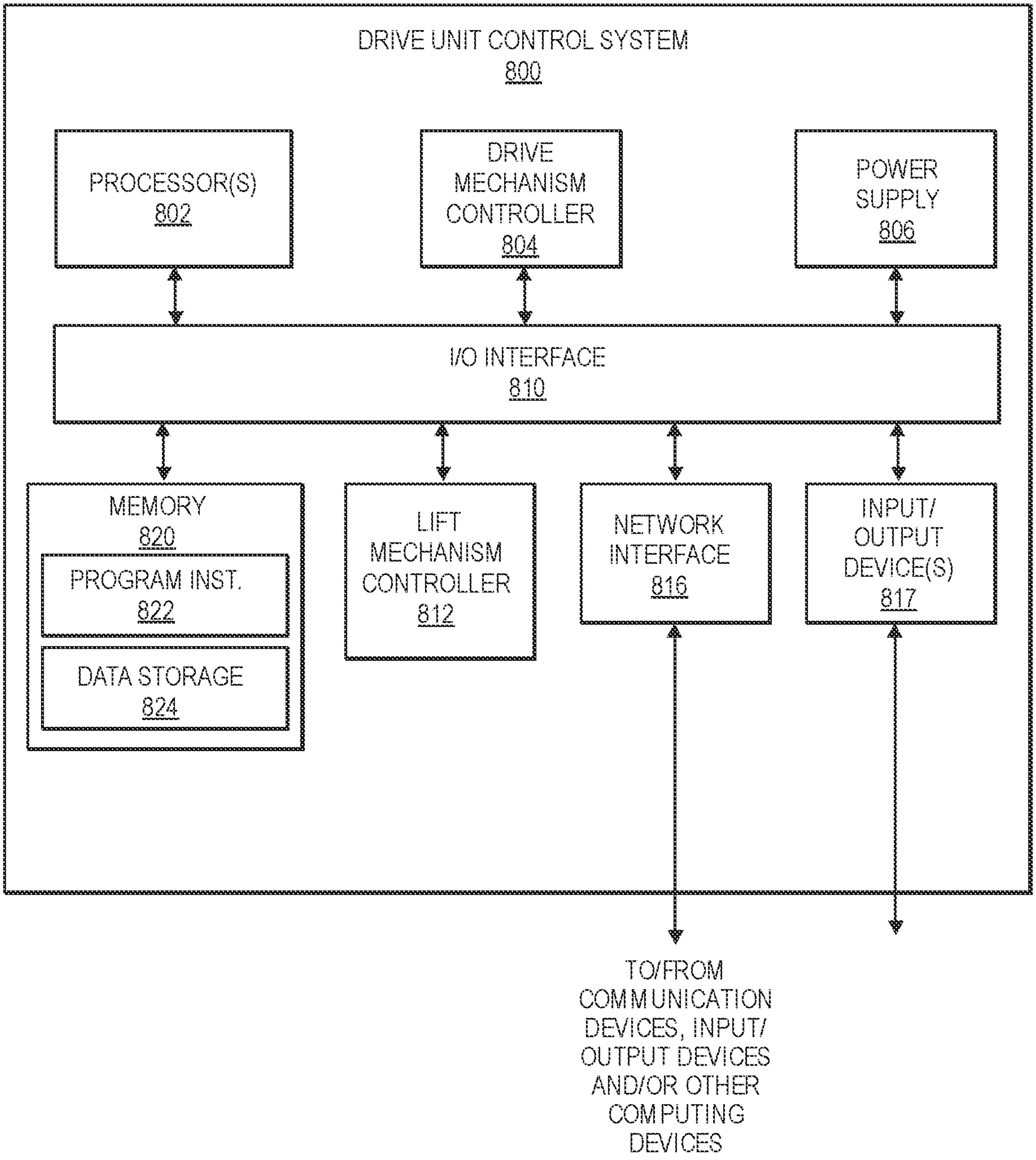
FIG. 8 is a block diagram illustrating various components of an example drive unit control system, in accordance with implementations of the present disclosure.

FIG. 8 is a block diagram illustrating various components of an example drive unit control system 800, in accordance with implementations of the present disclosure.

In various examples, the block diagram may be illustrative of one or more aspects of a robotic drive unit controller or control system 800 that may be used to implement the various systems and processes discussed above. In the illustrated implementation, the drive unit control system 800 includes one or more processors 802, coupled to a non-transitory computer readable storage medium 820 via an input/output (I/O) interface 810. The drive unit control system 800 may also include a drive mechanism controller 804 and a power supply or battery 806. The drive unit control system 800 may further include a lift mechanism controller 812, a network interface 816, and one or more input/output devices 817.

In various implementations, the drive unit control system 800 may be a uniprocessor system including one processor 802, or a multiprocessor system including several processors 802 (e.g., two, four, eight, or another suitable number). The processor(s) 802 may be any suitable processor capable of executing instructions. For example, in various implementations, the processor(s) 802 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 802 may commonly, but not necessarily, implement the same ISA.

The non-transitory computer readable storage medium 820 may be configured to store executable instructions, applications, drivers, and/or data, such as drive unit data, drive unit identifier data, package data, package identifier data, cart data, cart identifier data, destination data, path data, position or location data, fiducial marker data, drive mechanism data, lift mechanism data, station data, sensor data, and/or other data items accessible by the processor(s) 802. In various implementations, the non-transitory computer readable storage medium 820 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable storage medium 820 as program instructions 822 and data storage 824. In other implementations, program instructions, applications, drivers, and/or data may be received, sent or stored upon different types of computer-accessible media, such as non-transitory media, or on similar media separate from the non-transitory computer readable storage medium 820 or the drive unit control system 800.

Generally, a non-transitory, computer readable storage medium may include storage media or memory media such as magnetic or optical media, e.g., disk or CD/DVD-ROM, coupled to the drive unit control system 800 via the I/O interface 810. Program instructions and data stored via a non-transitory computer readable medium may be transmitted by transmission media or signals, such as electrical, electromagnetic, or digital signals, which may be conveyed via a communication medium such as a network and/or a wireless link, such as may be implemented via the network interface 816.

In one implementation, the I/O interface 810 may be configured to coordinate I/O traffic between the processor(s) 802, the non-transitory computer readable storage medium 820, and any peripheral devices, the network interface 816 or other peripheral interfaces, such as input/output devices 817. In some implementations, the I/O interface 810 may perform any necessary protocol, timing or other data transformations to convert data signals from one component (e.g., non-transitory computer readable storage medium 820) into a format suitable for use by another component (e.g., processor(s) 802). In some implementations, the I/O interface 810 may include support for devices attached through various types of peripheral buses, such as a variant of the Peripheral Component Interconnect (PCI) bus standard or the Universal Serial Bus (USB) standard, for example. In some implementations, the function of the I/O interface 810 may be split into two or more separate components, such as a north bridge and a south bridge, for example. Also, in some implementations, some or all of the functionality of the I/O interface 810, such as an interface to the non-transitory computer readable storage medium 820, may be incorporated directly into the processor(s) 802.

The drive mechanism controller 804 may communicate with the processor(s) 802, the non-transitory computer readable storage medium 820, and/or other components described herein to adjust the operational characteristics of motors or other actuators associated with each drive mechanism to move the drive unit along a determined path to a position or location and/or to perform other navigational maneuvers or operations.

The drive unit control system 800 may also include a lift mechanism controller 812 that communicates with the processor(s) 802, the non-transitory computer readable storage medium 820, and/or other components described herein to receive, lift, move, transfer, release, and/or place respective packages moved or carried by drive units, and/or to couple to, engage, lift, move, transfer, lower, release, and/or place respective carts moved or carried by drive units.

The network interface 816 may be configured to allow data to be exchanged between the drive unit control system 800, other devices attached to a network, such as other computer systems, package sortation system controllers, controllers associated with various stations, control systems of other drive units, and/or other vehicles, systems, machines, equipment, apparatuses, systems, sensors, or devices associated with the package sortation system and/or the environment utilizing the package sortation system. For example, the network interface 816 may enable wireless communication between numerous drive units. In various implementations, the network interface 816 may support communication via wireless general data networks, such as a Wi-Fi network. For example, the network interface 816 may support communication via telecommunications networks such as cellular communication networks, satellite networks, and the like.

Input/output devices 817 may, in some implementations, include one or more visual input/output devices, audio input/output devices, displays, imaging sensors, imaging or scanning devices, thermal sensors, infrared sensors, time of flight sensors, accelerometers, various other sensors described herein, etc. Multiple input/output devices 817 may be present and controlled by the drive unit control system 800. One or more of these sensors may be utilized to assist in performing the various functions, operations, and processes described herein.

As shown in FIG. 8, the memory may include program instructions 822 which may be configured to implement the example processes and/or sub-processes described above. The data storage 824 may include various data stores for maintaining data items that may be provided for performing the various functions, operations, and processes described herein. For example, the data storage 824 may include drive unit data, drive unit identifier data, package data, package identifier data, cart data, cart identifier data, destination data, path data, position or location data, fiducial marker data, drive mechanism data, lift mechanism data, station data, sensor data, and/or other data items.

Those skilled in the art will appreciate that the drive unit control system 800 is merely illustrative and is not intended to limit the scope of the present disclosure. In particular, the computing system and devices may include any combination of hardware or software that can perform the indicated functions, including other control systems or controllers, computers, network devices, robotic devices, etc. The drive unit control system 800 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

Figure 9:
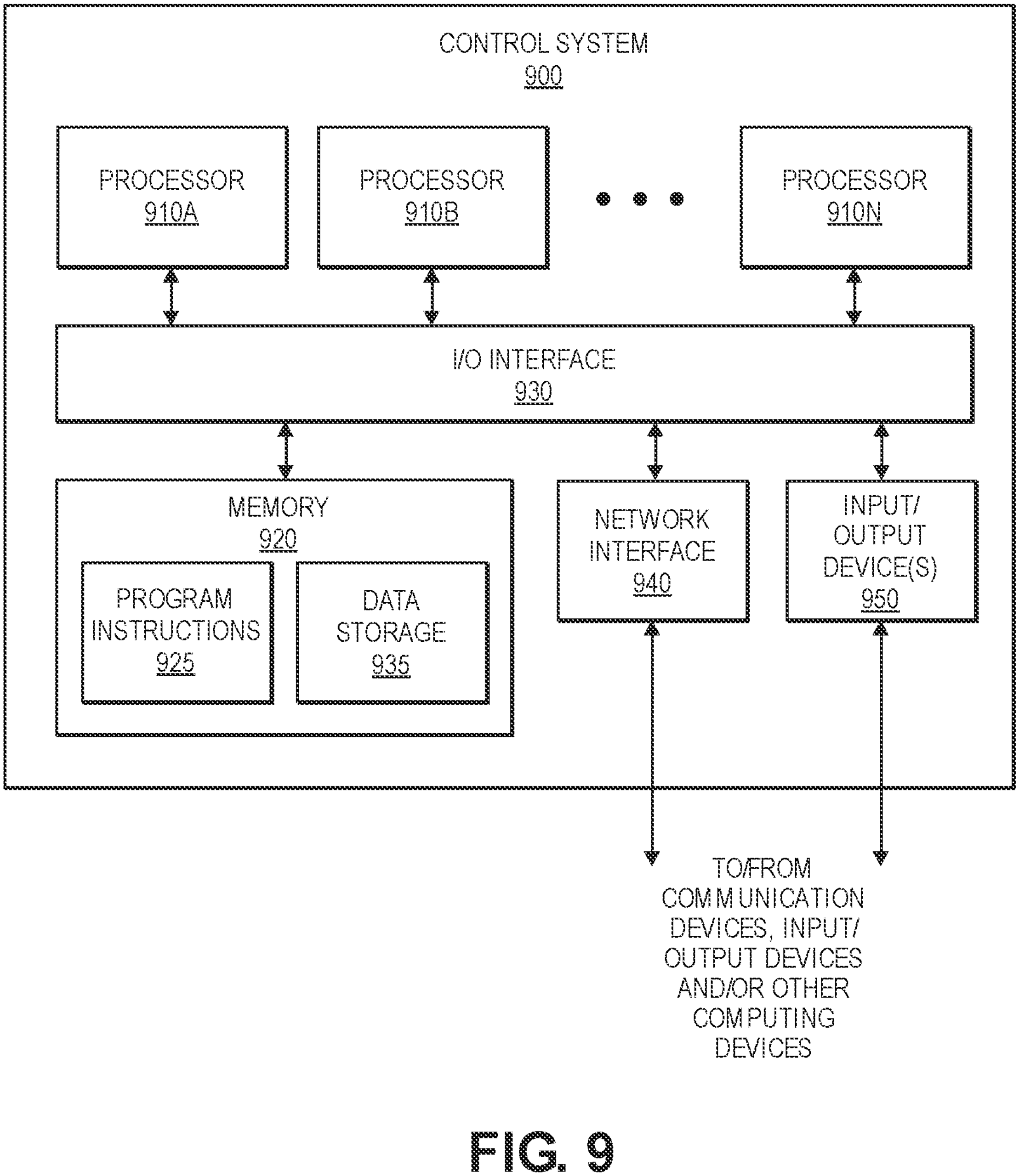
FIG. 9 is a block diagram illustrating various components of an example control system, in accordance with implementations of the present disclosure.

FIG. 9 is a block diagram illustrating various components of an example control system 900, in accordance with implementations of the present disclosure.

Various operations of a control system or controller, such as those described herein, may be executed on one or more computer systems, and/or interacting with various other computers, systems, or devices in a material handling facility, warehouse, or other environment, according to various implementations. For example, the control system or controller discussed herein may function and operate on one or more computer systems. One such control system is illustrated by the block diagram in FIG. 9. In the illustrated implementation, a control system 900 includes one or more processors 910A, 910B through 910N, coupled to a non-transitory computer-readable storage medium 920 via an input/output (I/O) interface 930. The control system 900 further includes a network interface 940 coupled to the I/O interface 930, and one or more input/output devices 950. In some implementations, it is contemplated that a described implementation may be implemented using a single instance of the control system 900 while, in other implementations, multiple such systems or multiple nodes making up the control system 900 may be configured to host different portions or instances of the described implementations. For example, in one implementation, some data sources or services (e.g., related to portions of package sortation systems, operations, or processes, etc.) may be implemented via one or more nodes of the control system 900 that are distinct from those nodes implementing other data sources or services (e.g., related to other portions of package sortation systems, operations, or processes, etc.).

In various implementations, the control system 900 may be a uniprocessor system including one processor 910A, or a multiprocessor system including several processors 910A-910N (e.g., two, four, eight, or another suitable number). The processors 910A-910N may be any suitable processor capable of executing instructions. For example, in various implementations, the processors 910A-910N may be general-purpose or embedded processors implementing any of a variety of instruction set architectures (ISAs), such as the x86, PowerPC, SPARC, or MIPS ISAs, or any other suitable ISA. In multiprocessor systems, each of the processors 910A-910N may commonly, but not necessarily, implement the same ISA.

The non-transitory computer-readable storage medium 920 may be configured to store executable instructions and/or data accessible by the one or more processors 910A-910N. In various implementations, the non-transitory computer-readable storage medium 920 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions and/or processes, such as those described above, are shown stored within the non-transitory computer-readable storage medium 920 as program instructions 925 and data storage 935, respectively. In other implementations, program instructions and/or data may be received, sent or stored upon different types of computer-accessible media, such as non-transitory media, or on similar media separate from the non-transitory computer-readable storage medium 920 or the control system 900. Generally speaking, a non-transitory, computer-readable storage medium may include storage media or memory media such as magnetic or optical media, e.g., disk or CD/DVD-ROM, coupled to the control system 900 via the I/O interface 930. Program instructions and data stored via a non-transitory computer-readable medium may be transmitted by transmission media or signals such as electrical, electromagnetic, or digital signals, which may be conveyed via a communication medium such as a network and/or a wireless link, such as may be implemented via the network interface 940.

In one implementation, the I/O interface 930 may be configured to coordinate I/O traffic between the processors 910A-910N, the non-transitory computer-readable storage medium 920, and any peripheral devices, including the network interface 940 or other peripheral interfaces, such as input/output devices 950. In some implementations, the I/O interface 930 may perform any necessary protocol, timing or other data transformations to convert data signals from one component (e.g., non-transitory computer-readable storage medium 920) into a format suitable for use by another component (e.g., processors 910A-910N). In some implementations, the I/O interface 930 may include support for devices attached through various types of peripheral buses, such as a variant of the Peripheral Component Interconnect (PCI) bus standard or the Universal Serial Bus (USB) standard, for example. In some implementations, the function of the I/O interface 930 may be split into two or more separate components, such as a north bridge and a south bridge, for example. Also, in some implementations, some or all of the functionality of the I/O interface 930, such as an interface to the non-transitory computer-readable storage medium 920, may be incorporated directly into the processors 910A-910N.

The network interface 940 may be configured to allow data to be exchanged between the control system 900 and other devices attached to a network, such as other control systems, material handling system controllers, warehouse management systems, other computer systems, robotic arms, machines, or systems, drive unit control systems, conveyance mechanisms, controllers associated with various stations, various types of sensors, various types of vision systems, imaging devices, imaging sensors, or scanning devices, upstream stations or processes, downstream stations or processes, other material handling systems or equipment, or between nodes of the control system 900. In various implementations, the network interface 940 may support communication via wired or wireless general data networks, such as any suitable type of Ethernet network.

Input/output devices 950 may, in some implementations, include one or more visual input/output devices, displays, projection devices, audio input/output devices, keyboards, keypads, touchpads, scanning devices, imaging devices, sensors, photo eyes, proximity sensors, RFID readers, voice or optical recognition devices, or any other devices suitable for entering or retrieving data by one or more control systems 900. Multiple input/output devices 950 may be present in the control system 900 or may be distributed on various nodes of the control system 900. In some implementations, similar input/output devices may be separate from the control system 900 and may interact with one or more nodes of the control system 900 through a wired or wireless connection, such as over the network interface 940.

As shown in FIG. 9, the memory 920 may include program instructions 925 that may be configured to implement one or more of the described implementations and/or provide data storage 935, which may comprise various tables, data stores and/or other data structures accessible by the program instructions 925. The program instructions 925 may include various executable instructions, programs, or applications to facilitate package sortation operations and processes described herein, such as robotic arm, machine, or apparatus controllers, drivers, or applications, conveyance mechanism controllers, drivers, or applications, drive unit controllers, drivers, or applications, actuator controllers, drivers, or applications, sensor controllers, drivers, or applications, sensor data processing applications, vision system, imaging device, and scanning device controllers, drivers, or applications, imaging or scanning data processing applications, material handling equipment controllers, drivers, or applications, upstream station controllers, drivers, or applications, downstream station controllers, drivers, or applications, etc. The data storage 935 may include various data stores for maintaining data related to systems, operations, or processes described herein, such as robotic arms, machines, or apparatus, conveyance mechanisms, drive units, packages, carts, destinations, package induct stations, first drive unit fields, cart building stations, sortation fields, cart transfer stations, actuators, sensors, vision systems, imaging devices, or scanning devices, material handling equipment or apparatus, upstream systems, stations, or processes, downstream systems, stations, or processes, etc.

Those skilled in the art will appreciate that the control system 900 is merely illustrative and is not intended to limit the scope of implementations. In particular, the control system and devices may include any combination of hardware or software that can perform the indicated functions, including other control systems or controllers, computers, network devices, internet appliances, robotic devices, etc. The control system 900 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the flow charts shown in FIGS. 5-7, orders in which such methods or processes are presented are not intended to be construed as any limitation on the claimed inventions, and any number of the method or process steps or boxes described herein can be omitted, reordered, or combined in any order and/or in parallel to implement the methods or processes described herein. Also, the drawings herein are not drawn to scale.

Conditional language, such as, among others, “can,” “could,” “might,” or “may,” unless specifically stated otherwise, or otherwise understood within the context as used, is generally intended to convey in a permissive manner that certain implementations could include, or have the potential to include, but do not mandate or require, certain features, elements and/or steps. In a similar manner, terms such as “include,” “including” and “includes” are generally intended to mean “including, but not limited to.” Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. An automated package sortation method, comprising:
- causing transfer, via a conveyor, of a plurality of packages to a package induct station;
- causing picking, by a first robotic arm, of an individual package from the plurality of packages on the conveyor, the individual package being associated with a destination;
- causing placement, by the first robotic arm, of the individual package directly onto an upper surface of a first robotic drive unit;
- causing movement, by the first robotic drive unit, of the individual package from the package induct station to a cart building station;
- causing movement, by a second robotic drive unit, of a cart from a sortation field to the cart building station, the cart being associated with a same destination as the individual package;
- causing picking, by a second robotic arm, of the individual package directly from the upper surface of the first robotic drive unit;
- causing placement, by the second robotic arm, of the individual package onto the cart;
- causing movement, by the second robotic drive unit, of the cart with the individual package from the cart building station to the sortation field; and
- causing movement, by a third robotic drive unit, of the cart with the individual package out of the sortation field via a cart transfer station;
- wherein the sortation field comprises at least one wall surrounding the sortation field, and the cart transfer station is associated with the at least one wall and configured to enable movement of the third robotic drive unit and the cart out of the sortation field.

2. The automated package sortation method of claim 1, further comprising:
- causing scanning, by a first imaging device proximate the package induct station, of a package identifier associated with the individual package;
- causing scanning, by a second imaging device proximate the package induct station, of a first drive unit identifier associated with the first robotic drive unit; and
- responsive to placement of the individual package onto the first robotic drive unit, associating the package identifier with the first drive unit identifier.

3. The automated package sortation method of claim 2, further comprising:
- determining the cart building station to which to move the individual package based at least in part on the package identifier; and
- determining the cart to move from the sortation field to the cart building station based at least in part on the package identifier.

4. The automated package sortation method of claim 3, further comprising:
- causing scanning, by a third imaging device proximate the cart building station, of the package identifier associated with the individual package;
- causing scanning, by a fourth imaging device proximate the cart building station, of a cart identifier associated with the cart; and
- responsive to placement of the individual package onto the cart, associating the package identifier with the cart identifier.

5. The automated package sortation method of claim 1, further comprising:
- prior to causing movement of the cart to the cart transfer station, determining that at least one of: the cart is full, or a current time is associated with an eject time of the cart;
- determining that an empty cart is to be injected via the cart transfer station to the sortation field; and
- responsive to determining that the empty cart is to be injected, causing movement, by a fourth robotic drive unit, of the empty cart via the cart transfer station to the sortation field.

6. A method, comprising:
- causing transfer, by a first robotic arm at a package induct station, of a package from a conveyance mechanism directly to an upper surface of a first drive unit;
- causing movement, by the first drive unit, of the package from the package induct station to a cart building station;
- causing transfer, by a second robotic arm at the cart building station, of the package directly from the upper surface of the first drive unit to a cart;
- causing movement, by a second drive unit, of the cart with the package from the cart building station to a sortation field;
- determining to eject the cart out of the sortation field; and
- responsive to determining to eject the cart, causing movement, by a third drive unit, of the cart with the package out of the sortation field via a cart transfer station;
- wherein the package and the cart are associated with a same destination; and
- wherein the sortation field comprises at least one wall surrounding the sortation field, and the cart transfer station is associated with the at least one wall and configured to enable movement of the third drive unit and the cart out of the sortation field.

7. The method of claim 6, further comprising:

causing movement, by the second drive unit, of the cart from the sortation field to the cart building station;

wherein the movement of the package by the first drive unit to the cart building station and the movement of the cart by the second drive unit to the cart building station occur at least partially concurrently.

8. The method of claim 7, further comprising:

causing scanning, by at least one imaging device proximate the package induct station, of a package identifier associated with the package;

causing scanning, by the at least one imaging device proximate the package induct station, of a first drive unit identifier associated with the first drive unit; and responsive to transfer of the package to the first drive unit, associating the package identifier with the first drive unit identifier.

9. The method of claim 8, further comprising:

selecting the cart building station, from a plurality of cart building stations, to which to move the package based at least in part on the package identifier; and selecting the cart, from a plurality of carts, to move from the sortation field to the cart building station based at least in part on the package identifier.

10. The method of claim 9, further comprising:

causing scanning, by at least one imaging device proximate the cart building station, of the package identifier associated with the package;

causing scanning, by the at least one imaging device proximate the cart building station, of a cart identifier associated with the cart; and responsive to transfer of the package to the cart, associating the package identifier with the cart identifier.

11. The method of claim 6, further comprising:

causing placement of the cart at the cart building station for a period of time;

wherein causing transfer, by the second robotic arm at the cart building station, of the package from the first drive unit to the cart further comprises causing transfer, by the second robotic arm, of a plurality of packages from a plurality of drive units to the cart during the period of time.

12. The method of claim 6, further comprising:

selecting a storage location for the cart within the sortation field; and causing storage, by the second drive unit, of the cart with the package at the storage location within the sortation field.

13. The method of claim 12, wherein the storage location for the cart is selected based on at least one of a destination, a velocity of received packages, or a load status associated with the cart.

14. The method of claim 6, wherein the cart is determined to be ejected out of the sortation field based on at least one of: the cart having a full load status, or a current time being associated with an eject time of the cart; and wherein the cart with the package is moved out of the sortation field to at least one of an outbound dock or a shipping container.

15. The method of claim 14, further comprising:

selecting the cart transfer station, from a plurality of cart transfer stations, to eject the cart;

wherein the cart transfer station is selected based at least in part on a proximity to at least one of the outbound dock or the shipping container to receive the cart for shipping.

16. The method of claim 6, further comprising:

determining that an empty cart is to be injected via the cart transfer station to the sortation field; and responsive to determining that the empty cart is to be injected, causing movement, by a fourth drive unit, of the empty cart from at least one of a storage area or an upstream process to the sortation field.

17. An automated package sortation system, comprising:

a conveyance mechanism configured to transfer a plurality of packages to a plurality of package induct stations;

the plurality of package induct stations including respective first robotic arms, the first robotic arms configured to transfer respective packages from the conveyance mechanism directly to respective upper surfaces of a plurality of first drive units, respective packages being associated with respective destinations;

the plurality of first drive units configured to transfer respective packages between the plurality of package induct stations and a plurality of cart building stations;

the plurality of cart building stations including respective second robotic arms, the second robotic arms configured to transfer respective packages directly from the respective upper surfaces of the plurality of first drive units to a plurality of carts moved by a plurality of second drive units, respective ones of the plurality of carts being associated with respective destinations;

the plurality of second drive units configured to move respective carts between the plurality of cart building stations and a sortation field configured to receive and store the plurality of carts; and a plurality of cart transfer stations configured to eject respective carts out of the sortation field or to inject empty carts into the sortation field;

wherein the sortation field comprises at least one wall surrounding the sortation field, and the plurality of cart transfer stations are associated with the at least one wall and configured to enable movement of respective carts and associated second drive units out of the sortation field and empty carts and associated second drive units into the sortation field.

18. The system of claim 17, further comprising:

at least one first imaging device associated with respective ones of the plurality of package induct stations;

wherein the at least one first imaging device is configured to scan at least one of package identifiers associated with respective packages or first drive unit identifiers associated with respective first drive units; and at least one second imaging device associated with respective ones of the plurality of cart building stations;

wherein the at least one second imaging device is configured to scan at least one of package identifiers associated with respective packages or cart identifiers associated with respective carts.

19. The system of claim 17, further comprising:

a plurality of buffer areas associated with respective ones of the plurality of cart building stations, the plurality of buffer areas configured to receive and store respective packages prior to transfer to respective ones of the plurality of carts.

20. The system of claim 17, wherein the plurality of second drive units are configured to at least one of couple to or lift respective carts in order to move the respective carts.

* * * * *